May 3, 1927.

M. M. GOLDBERG

CARD ASSORTING MACHINE

Filed Nov. 15, 1922

Inventor
MAXIMILIAN M. GOLDBERG
By Pearl Beust
Henry E Stauffer
His Attorneys

May 3, 1927.  
M. M. GOLDBERG  
CARD ASSORTING MACHINE  
Filed Nov. 15, 1922
1,627,028
12 Sheets-Sheet 3
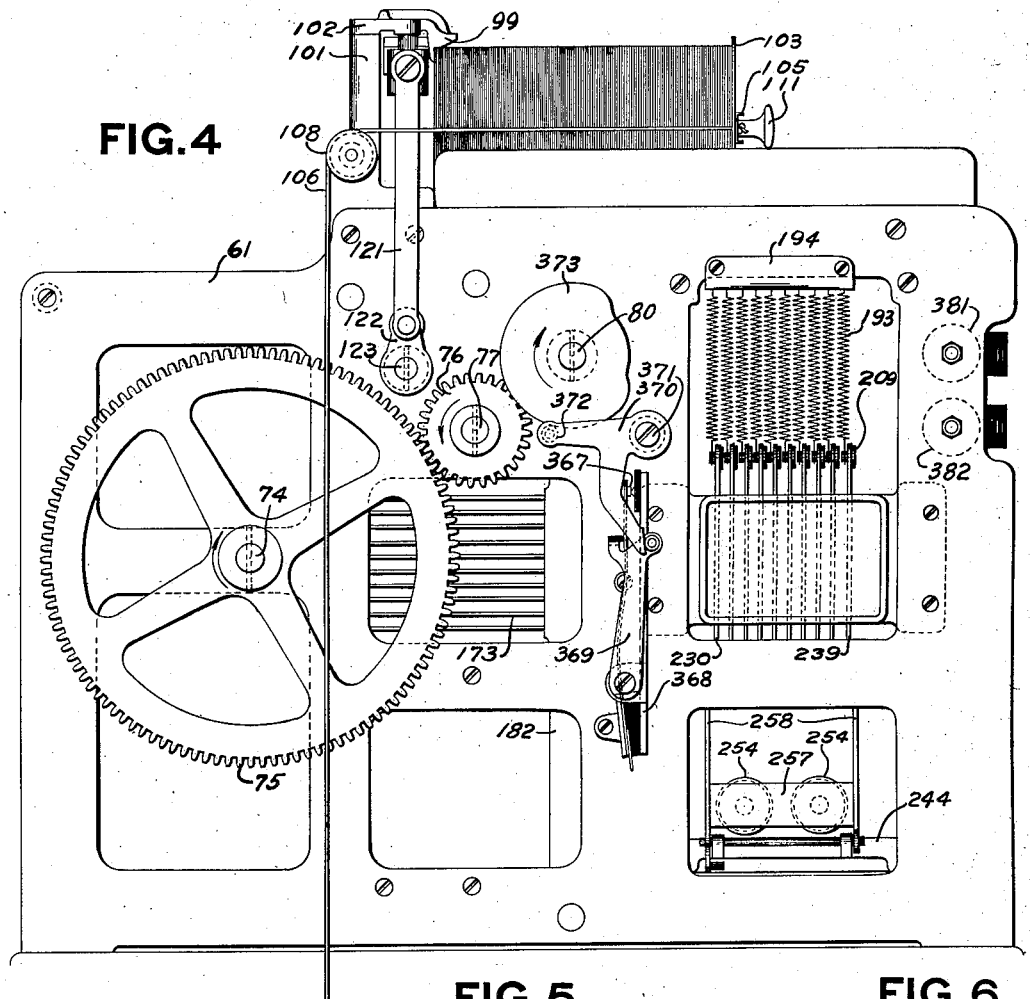
FIG. 4
FIG. 5
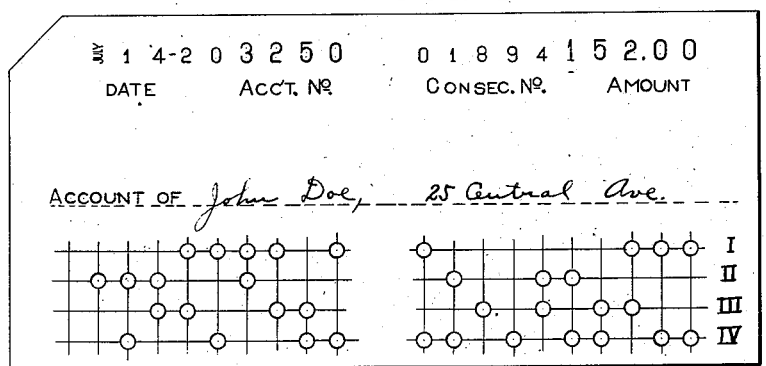
FIG. 6
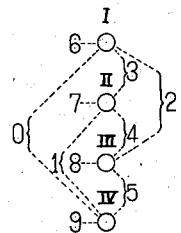
Inventor  
MAXIMILIAN M. GOLDBERG  
By Pearl Beust,  
and Henry C. Stauffer  
His Attorneys May 3, 1927.
M. M. GOLDBERG
CARD ASSORTING MACHINE
Filed Nov. 15, 1922
1,627,028
12 Sheets-Sheet 4
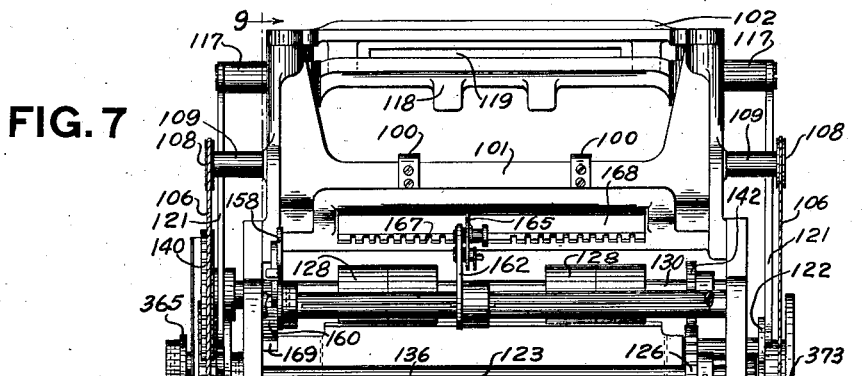
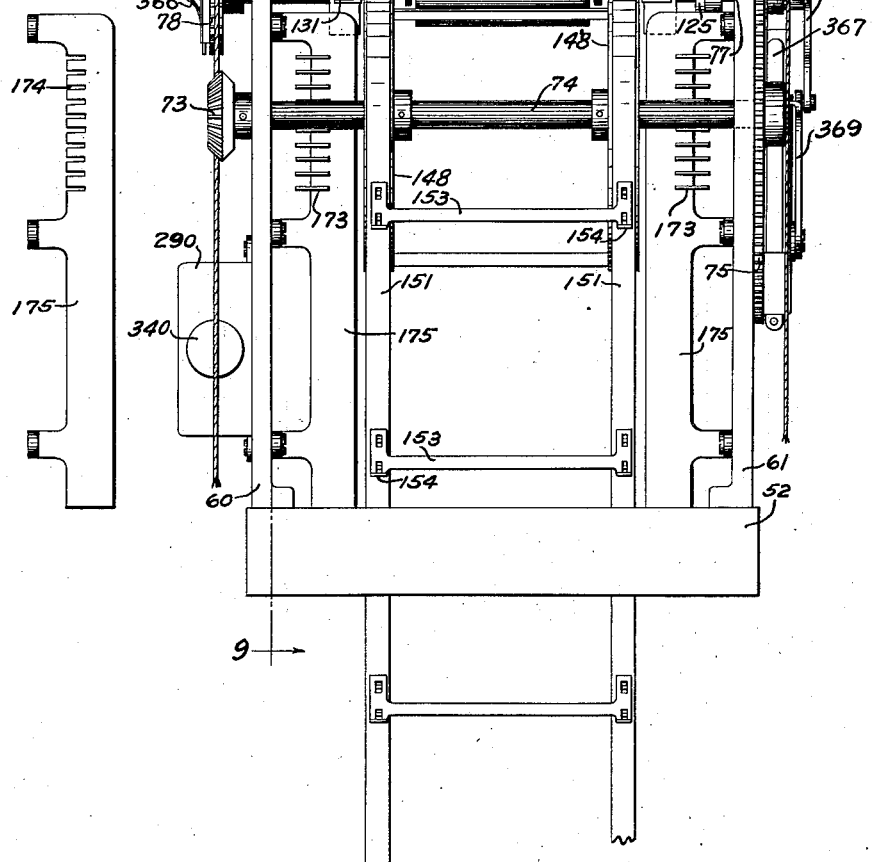
Inventor
MAXIMILIAN M. GOLDBERG
By Carl Beust
and Henry E. Stauffer
His Attorneys May 3, 1927.
M. M. GOLDBERG
CARD ASSORTING MACHINE
Filed Nov. 15, 1922
1,627,028
12 Sheets-Sheet 5
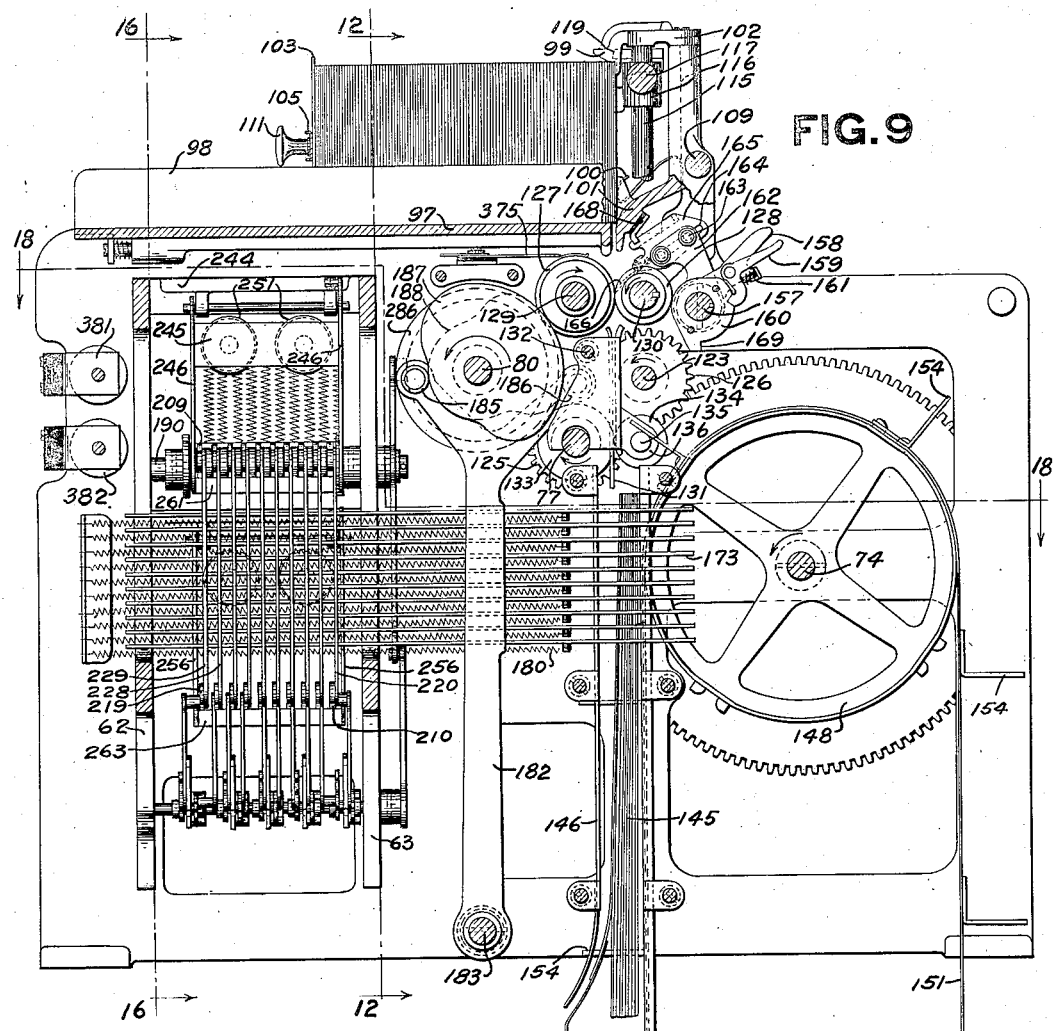
FIG. 9
FIG. 10
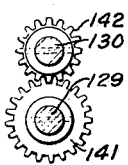
FIG. 11
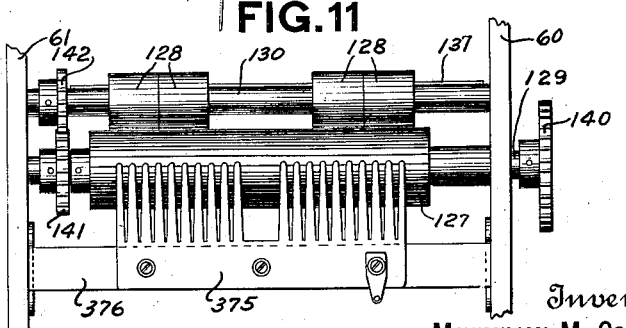
Inventor
MAXIMILIAN M. GOLDBERG
By Carl Beust
and Henry E Stauffer
His Attorneys

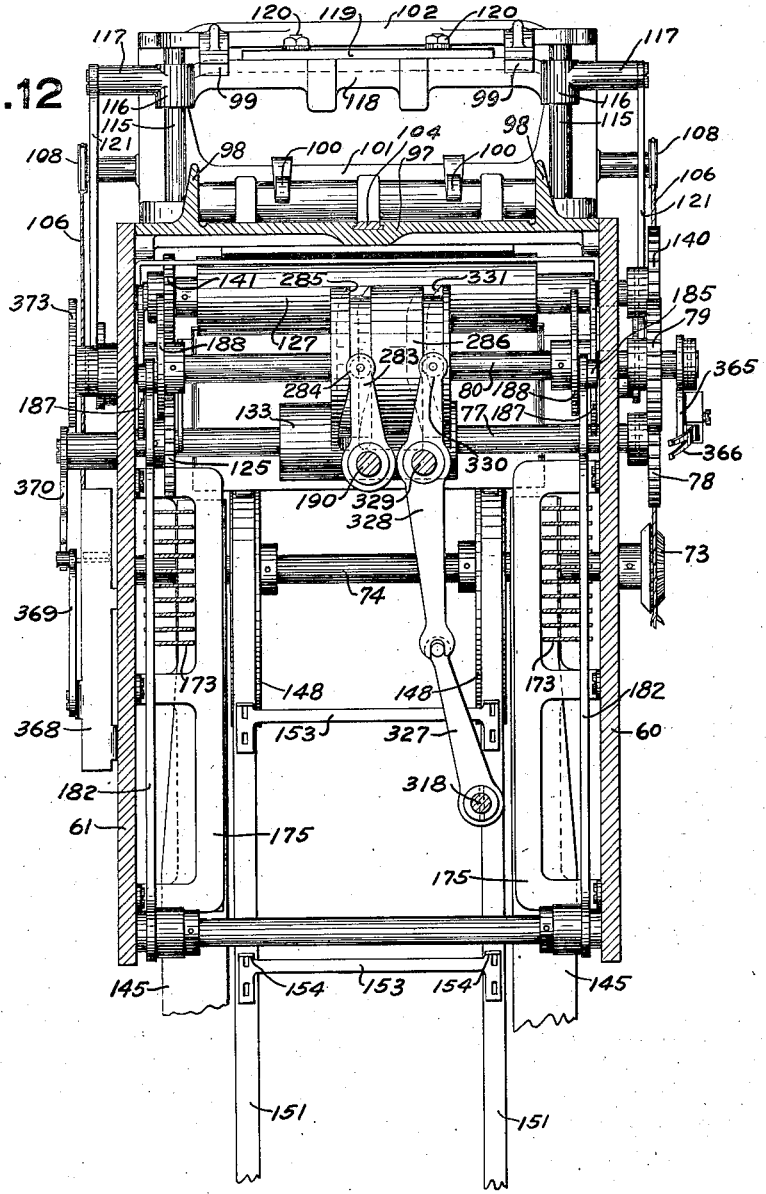

May 3, 1927.
M. M. GOLDBERG
1,627,028
CARD ASSORTING MACHINE
Filed Nov. 15, 1922  12 Sheets-Sheet 7
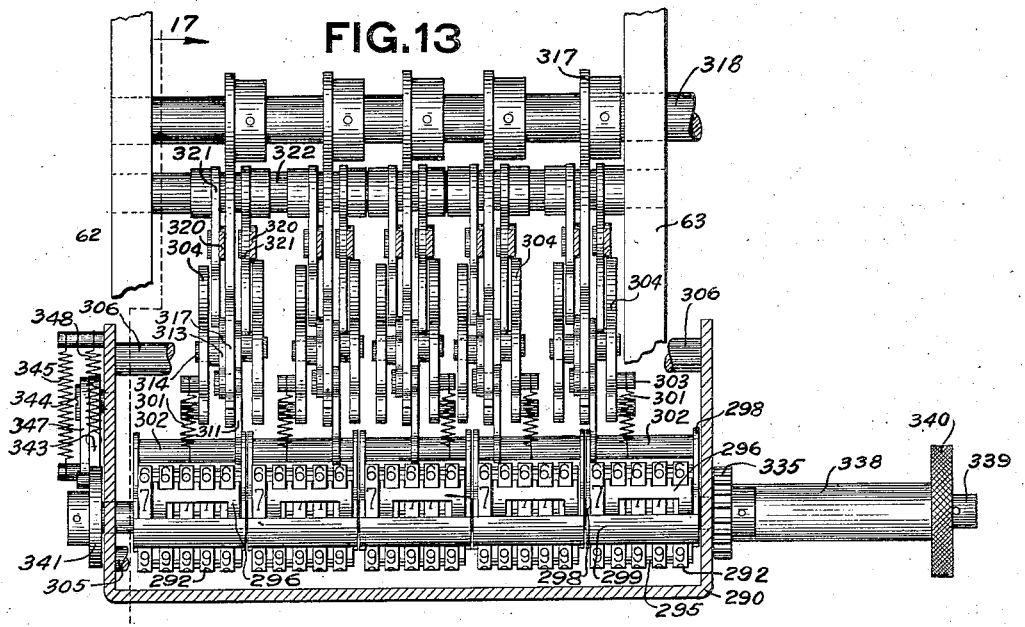
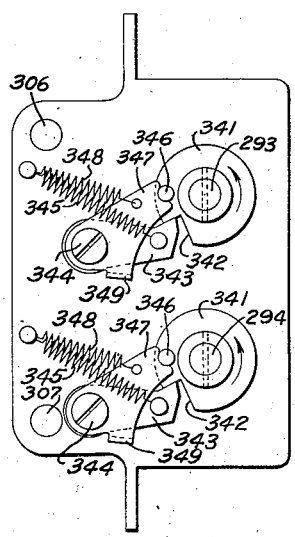
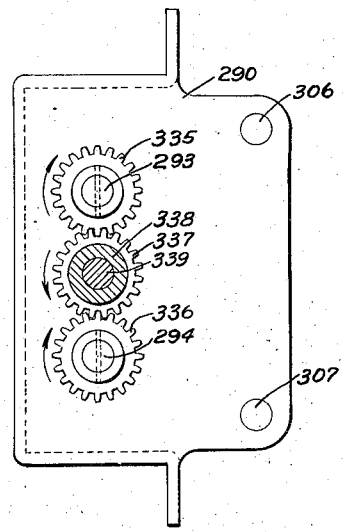
Inventor
MAXIMILIAN M. GOLDBERG
By Earl Beust
and Henry E. Stauffer
His Attorneys May 3, 1927.

M. M. GOLDBERG 1,627,028

CARD ASSORTING MACHINE

Filed Nov. 15, 1922

Inventor
MAXIMILIAN M. GOLDBERG
By
His Attorneys

May 3, 1927.
M. M. GOLDBERG
1,627,028
CARD ASSORTING MACHINE
Filed Nov. 15, 1922      12 Sheets-Sheet 9
FIG. 18
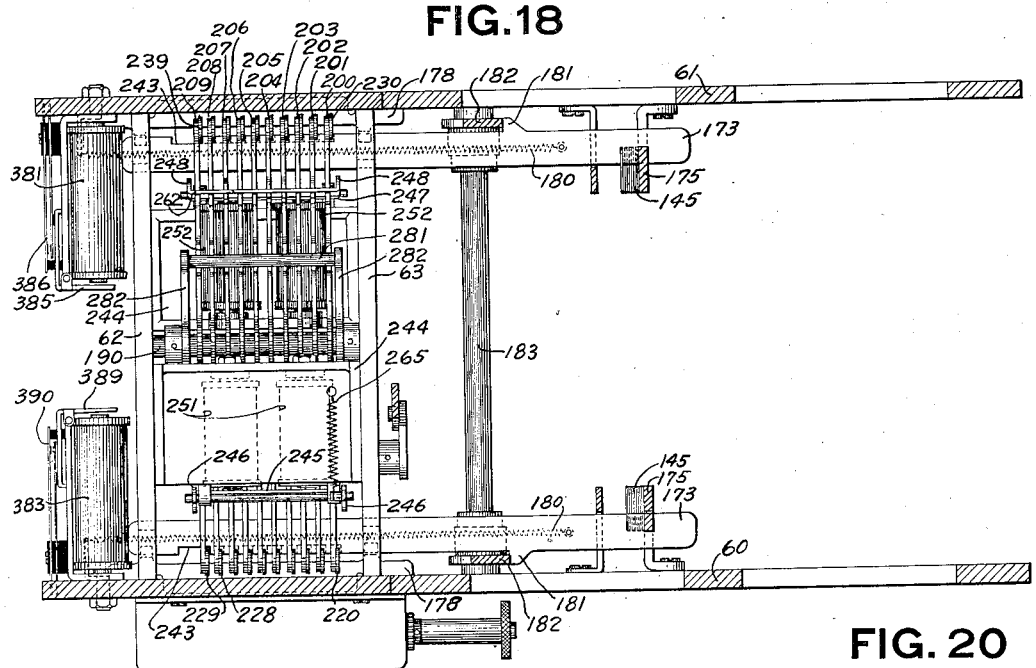
FIG. 19
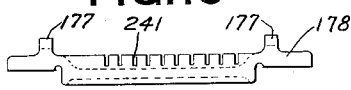
FIG. 20
FIG. 22
FIG. 21
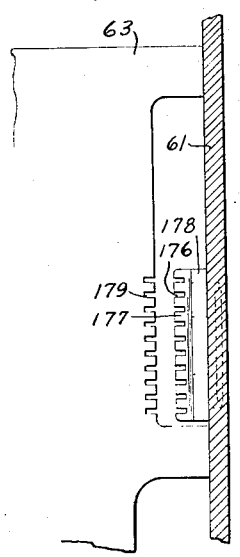
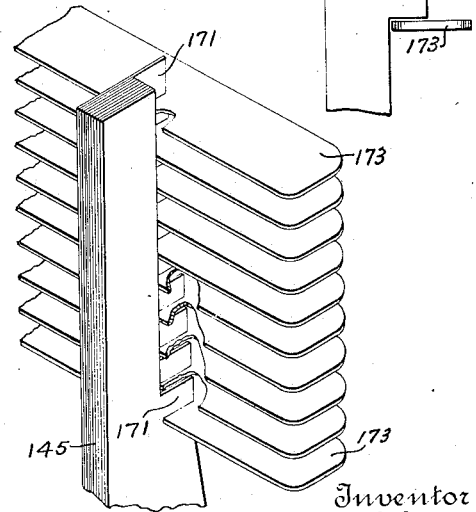
Inventor
MAXIMILIAN M. GOLDBERG
By Carl Beust
and Henry Stauffer
His Attorneys

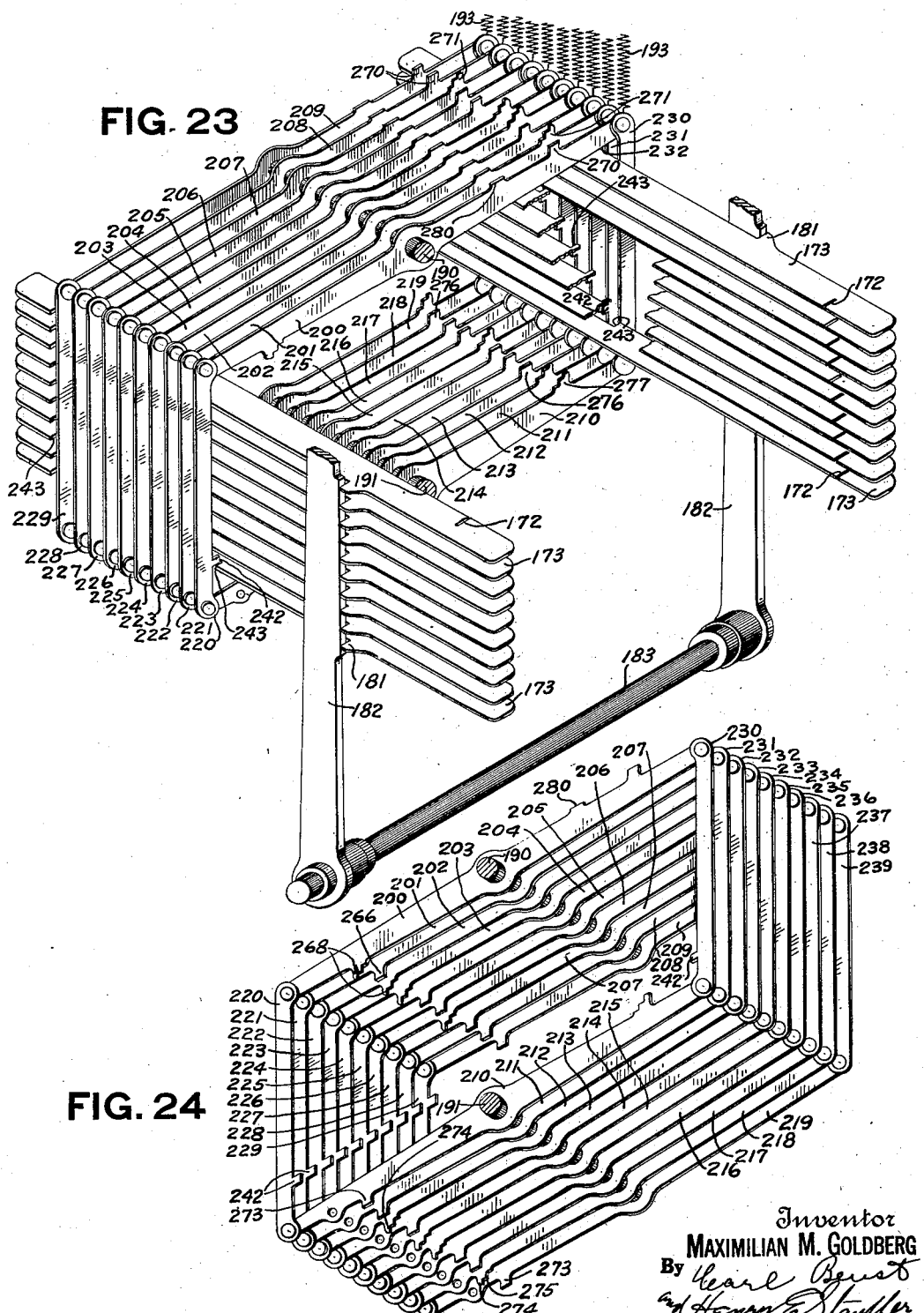

May 3, 1927.

M. M. GOLDBERG 1,627,028

CARD ASSORTING MACHINE

Filed Nov. 15, 1922  12 Sheets-Sheet 11

Inventor
MAXIMILIAN M. GOLDBERG
By Carl Beust
and Henry E. Stauffer
His Attorneys May 3, 1927.

M. M. GOLDBERG 1,627,028

CARD ASSORTING MACHINE

Filed Nov. 15, 1922

Inventor
MAXIMILIAN M. GOLDBERG
By Pearl Benst
and Henry E Stauffer
His Attorneys Patented May 3, 1927.

1,627,028

UNITED STATES PATENT OFFICE.

MAXIMILIAN M. GOLDBERG, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND.

CARD-ASSORTING MACHINE.

Application filed November 15, 1922. Serial No. 601,131.

This invention relates to assorting and distributing machines and particularly to that type of machine adapted to assort cards according to the perforated data thereon and to distribute the cards, as they are assorted, to various destination stations or pockets so that all cards in any one station will have the same data.

The main object of this invention is to produce a machine which will assort cards having only four control fields or positions in each column whereby a single perforation in any one of the four rows, or a combination of perforations will control the assorting and distributing mechanism.

Another object of this invention is to arrange a control for the assorting and distributing mechanism so that it operates in synchronism with the control positions of the card as the card is fed through the machine. This saves time as it is not necessary to stop the cards.

Another object of this invention is to provide a plurality of counting devices and selecting mechanism therefor. The selecting mechanism is designed to operate simultaneously with the assorting and distributing mechanisms so that the counter corresponding to the selected destination station will be selected for operation.

With these and incidental objects in view, the invention consists in certain novel features of construction and combinations of parts, the essential elements of which are set forth in appended claims and a preferred form of embodiment of which is hereinafter described with reference to the drawings which accompany and form part of this specification.

Of said drawings:

Fig. 4 is a left side elevation of the upper part of the machine.

Fig. 5 is a detail view showing a sample of the cards which are assorted by this machine.

Fig. 6 is a diagrammatic view showing how the perforations either singly or in combination are used to control the energization of the assorting magnets.

Fig. 7 is a rear end elevation of the upper part of the machine.

Fig. 8 is a detail view of one of the supporting members for the horizontal selecting bars.

Fig. 9 is a section on line 9—9 of Fig. 7 looking in the direction of the arrows.

Fig. 10 is a detail view of the driving gears for the upper feed rolls for the card.

Fig. 11 is a detail plan view of the upper feed rolls.

Fig. 12 is a section on line 12—12 of Fig. 9, looking in the direction of the arrows.

Fig. 13 is a plan view of a portion of the counters and their actuating means.

Fig. 14 is a left end elevation of the counter frame of Fig. 13 and shows a portion of the turn-to-zero mechanism.

Fig. 15 is a right end view of the counter frame showing another portion of the turn-to-zero mechanism.

Fig. 18 is a section on line 18—18 of Fig. 9, looking in the direction of the arrows.

Fig. 19 is a detail view of one of the guide plates for the horizontal bars and the vertical selecting links.

Fig. 20 is a detail view illustrating the connection between the distributing plates and the horizontal bars.

Fig. 21 is a detail view showing the supporting means for the horizontal bars.

Fig. 22 is a detail isometric view illustrating the connection between the horizontal bars and the distributing plates.

Fig. 23 is an isometric view illustrating how the selection is made for the distribution of the cards.

Fig. 24 is an isometric view looking at the bottom and right end of the selecting mechanism.

Figures 1, 2:
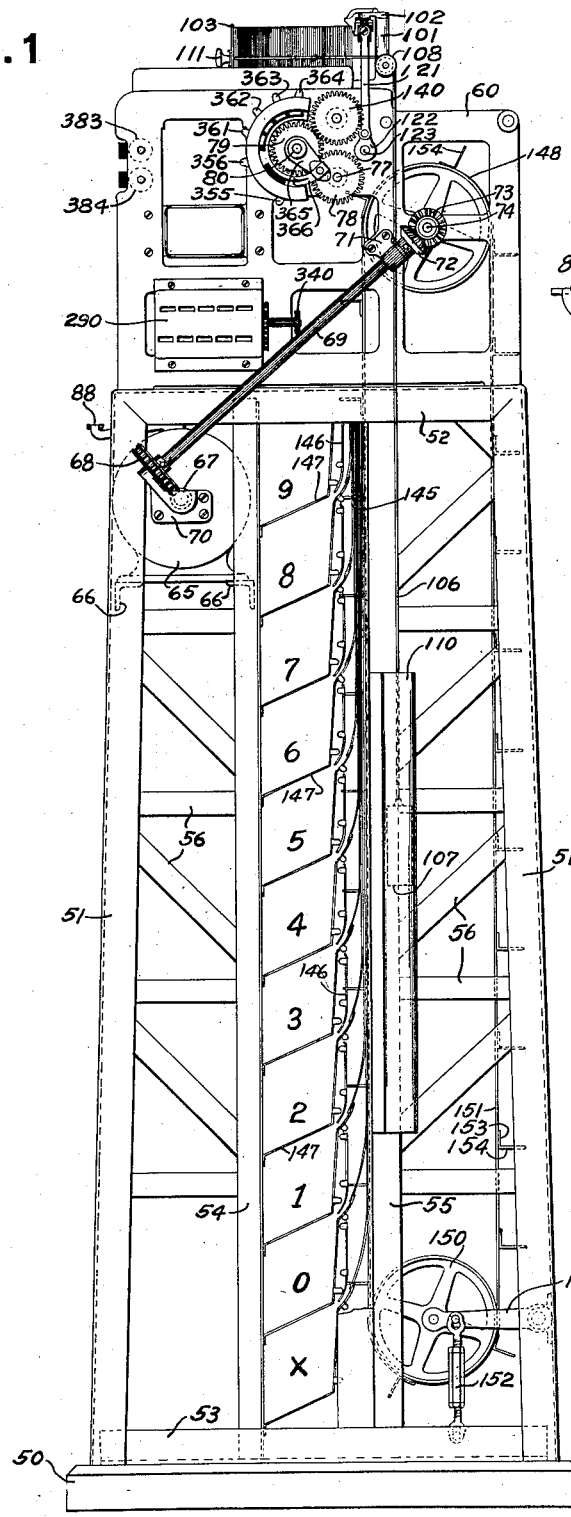
Fig. 1 is a right side elevation of the machine in reduced size.
Fig. 2 is a detail view of the motor switch, starting mechanism and the controlling magnet for stopping the machine.

In general.

This machine is designed to assort cards of the type illustrated in Fig. 5. These cards may be prepared, that is, printed and perforated with data, such as that illustrated, in any machine designed to make perforations representative of the ten digits according to the diagram illustrated in Fig. 6. For example, the perforating mechanism illustrated and described in applicant's application, Serial No. 390,378, filed June 21, 1920, may have a carriage inserted therein to support a card of this type so that it can be perforated as shown.

The cards are placed on a table on top of the assorting machine and fed downward one by one between two sets of feed rolls. As they pass the first set of feed rolls a contact brush engages the card, and wherever a perforation occurs an electric circuit is made which controls electro-magnets. These magnets in turn control the shifting of the upper ends of distributing or selecting plates so that the cards, after leaving the feed rolls, will pass between the desired plates. From here they are carried by an endless distributing belt down the path formed by the selected plates and deposited in various stations or pockets according to the location of the perforation or perforations in the column which is at that time co-acting with the brush.

As the distributing plates are moved to select a pocket a counter is actuated to count the cards as they go into this pocket. There is one counter for each of the upper ten pockets. The lower pocket does not have a counter associated therewith; the cards which are deposited in this pocket are deposited there because they have no perforations in the column which is at that time cooperating with the brush.

It is not intended to limit this invention to a machine having 10 selective pockets as it is within the scope of the invention to have a machine of as many as 16 selective pockets which can be selected by the different combinations made possible by four fields or positions in each column on the card.

Perforations.

The four holes in Fig. 6 are designated by the Roman numerals I, II, III and IV. The interpretation of the combinations is as follows: Perforations in the I and IV positions represent 0; perforations in the II and IV positions represent 1; perforations in the I and III positions represent 2; perforations in the I and II positions represent 3; perforations in the II and III positions represent 4; perforations in the III and IV positions represent 5; a single perforation in the I position represents 6; a single perforation in the II position represents 7; a single perforation in the III position represents 8; and a single perforation in the IV position represents 9. Thus it can be seen that by the combinations as above mentioned the digits 0 to 9 are all represented by the four holes.

The card.

As above mentioned, cards of this type, as illustrated in Fig. 5, may be prepared on any machine capable of making perforations representative of the ten digits according to the diagram in Fig. 6.

In order that the perforations in this card may be clearly understood they will be specifically described. There are four horizontal rows of perforations in this card designated by the Roman numerals I, II, III and IV, so that the positions on the card correspond to the positions so designated in the diagram of Fig. 6. The control fields or positions are arranged in columns of four fields each, that is, one field in each row arranged vertically constitutes a column. There may be one or two perforations in each column for determing the station to which the card is to be delivered.

Commencing with the right hand column it will be noticed that perforations occur in the I and IV positions, which, according to the diagram, represent 0; in the second column the perforations are also in the I and IV positions, which again represent 0; in the third column perforations occur in the I and III positions, which according to the diagram represent 2; in the fourth column perforations appear in the III and IV positions, which represent 5; in the fifth column perforations appear in the II and IV positions, which represent 1. For illustrative purposes these five columns have been set aside for the use of amounts, that is, dollars and cents. At the top of the card is a printed interpretation of the perforations as just described, which is $152.00.

The next five columns have been set aside for the consecutive number. In the sixth column from the right perforations appear in the II and III positions, which represent 4. In the seventh column a perforation appears in the IV position, which represents 9. In the eighth column a single perforation appears in the III position, which represents 8. In the ninth column perforations appear in the II and IV positions, which represent 1. In the tenth column perforations appear in the I and IV positions, which represent 0. The interpretation of these perforations is, as printed above them, "01894". This concludes the interpretation of the perforations of the right hand group.

The interpretation of the perforations of the left hand group will now be given. The first four right hand columns of the left hand group have been set aside for the account number. In the first column on the right of this group, perforations appear in the I and IV positions, which represent 0; in the second column perforations appear in the III and IV positions, which represent 5; in the third column perforations appear in the I and III positions, which represent 2; in the fourth column perforations appear in the I and II positions, which represent 3. Thus the entire interpretation of these four columns is as printed above "3250".

The next six columns have been set aside for the date, that is, columns 5 and 6 from the right of this group have been set aside for the year, columns 7 and 8 have been set aside for the days of the month and columns 9 and 10 have been set aside for the months of the year. In column 5 perforations occur in the I and IV positions, which represent 0; in column 6 perforations appear in the I and III positions which represent 2. Thus these two columns represent 20 as printed above. In column 7 perforations appear in the II and III positions, which represent 4; in column 8 perforations occur in the II and IV positions, which represent 1. Thus the interpretation of these two columns is "14". In column 9 a single perforation occurs in the II position, which represents "7". This, as printed above, represents the seventh month, or "July". As July is the seventh month there is no need for any perforations in the tenth column, therefore none occur. If the date had been December, which is the twelfth month, perforations would have been made in the blank column representative of 1, and perforations in the next column, which now shows "July" would have been in the I and III positions to represent 2, and these two columns would thus have represented the twelfth month. The interpretation of the date as perforated on the card is therefore "July 14–20".

The card has one corner cut off so that it can readily be seen when a card is improperly placed in any stack prior to assorting.

*Framework.*

As shown in Fig. 1 the entire machine is supported on a base 50. Resting on this base is a tower framework 51 consisting of substantially vertical angle-irons connected at the top by horizontal angle-irons 52. At the bottom the angle-irons are connected by braces 53. Two bars 54 and 55 extend from the base to the top of the tower. Braces 56 are used to increase the rigidity of the frame.

Mounted on top of the tower is the mechanism which assorts and counts the cards. This mechanism is supported by side frames 60 (Figs. 1 and 3) and 61 (Fig. 4).

These two frames 60 and 61 support practically all of the driving mechanism, as will be hereinafter described. Certain portions of the selecting mechanism are supported by frames 62 and 63 (Fig. 9). These frames are at right angles to the frames 60 and 61 (Fig. 18) and are secured thereto.

*Driving mechanism.*

The entire mechanism is driven by an electric motor 65 (Figs. 1 and 3), mounted on brackets 66. Meshing with the motor worm 67 is a worm gear 68 fast on a shaft 69 supported by a bracket 70 secured to the motor and a bracket 71 on the frame 60.

Fast on the shaft 69 is a bevel gear 72 meshing with a bevel gear 73 fast on a shaft 74 mounted in the frames 60 and 61. Also fast on the shaft 74 is a gear 75 (Figs. 4 and 7) meshing with a gear 76 fast on a shaft 77 supported by the frames 60 and 61. Fast on the other end of the shaft 77 is a gear 78 (Figs. 3, 7 and 12) meshing with a gear 79 fast on a main cam shaft 80.

Figure 3:
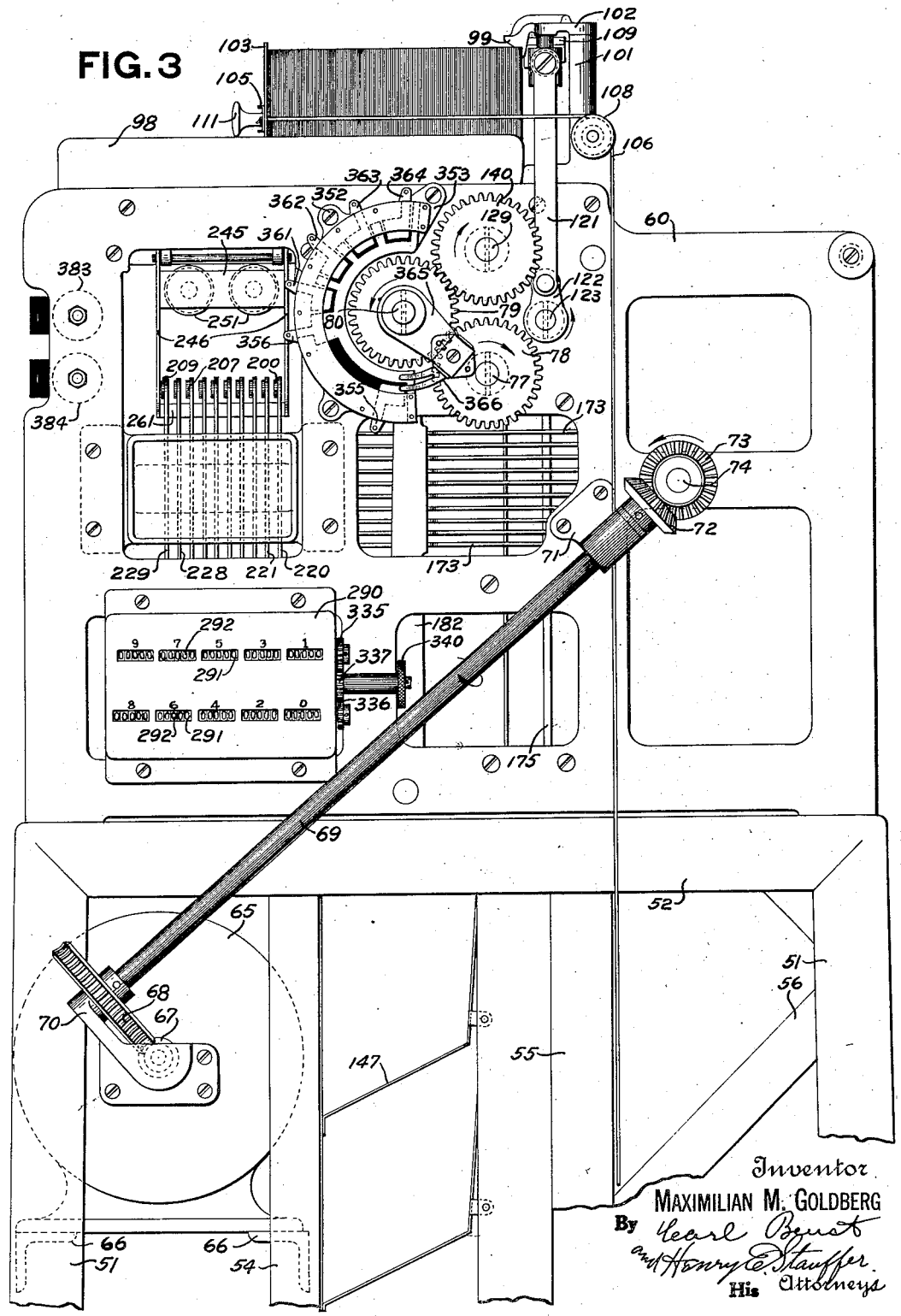
Fig. 3 is a right side elevation of the upper part of the machine.

Clockwise rotation of the shaft 69 (Figs. 1 and 3) through the bevel gears 72 and 73 rotates the shaft 74 counter-clockwise, which through the train of gears above described rotates the shaft 80 clockwise, (Fig. 4) or counter-clockwise, (Figs. 1 and 3).

*Starting mechanism.*

The starting mechanism for the motor will now be described. In order to start the machine a switch 85 (Fig. 2) in circuit with the motor must be closed. Co-operating with this switch is a lever 86 pivoted on a bracket 87 supported by the framework 51. The lever 86 has integral therewith a starting key 88. Depression of this key rocks the lever 86 counter-clockwise and a bar of insulation 89 thereon closes the switch 85, which completes the circuit through the motor 65. This switch is held closed through a number of cycles of operation. The lever 86 has a projection 90 normally engaging the upper side of a hook 91 integral with a lever 92 pivoted on the bracket 87. Depression of the starting key 88 rocks the lever 92 counter-clockwise until the projection 90 gets below the hook 91. When this occurs a spring 93 moves the hook over the projection 90, thus holding the key 88 in the depressed position, which keeps the switch 85 closed. A block 94 on the lever 86 prevents the key 88 from being raised past normal position. After the switch 85 has been closed the machine will continue to run until the switch is opened by means to be hereinafter described.

*Card feeding mechanism.*

When preparing to assort a number of cards they are placed on a table 97 (Figs. 12 and 16) having guide flanges 98. This table is secured to the frames 60 and 61. The cards are put upon the table in such a position that the first one to be moved downward engages two blocks 99 and two springs 100. The springs are secured to a casting 101 fastened to the frames 60 and 61. The blocks 99 are integral with a casting 102, secured to the casting 101, (Fig. 9). The cards are made to stand straight by means of a plate 103 having an integral portion 104 (Fig. 12) which slides in a groove in the table 97.

As a card is fed downward from this stack it is necessary that the remaining ones be moved to the right (Figs. 3 and 9). This is done in the following way: Secured to the plate 103 is a bar 105 having secured at each end a rope or cable 106 to which is attached a weight 107 (Fig. 1). These ropes run over pulleys 108 mounted on studs 109 secured to the casting 101. Shields 110 (Fig. 1) are used to keep the weights 107 from swinging, thus preventing the rope from jumping off the pulleys. Thus it can be seen that as the first card is fed downward from the stack, the weights 107 move the stack to the right (Figs. 3 and 9), and move the second card into engagement with the blocks 99 and springs 100. A knob 111 secured to the bar 105 may be grasped to pull the plate 103 back after all of the cards are assorted so that a new stack may be placed upon the table.

The means for moving the cards downward one by one from the stack on the table will now be described. Mounted in the base of the castings 101 and 102 are vertical rods 115 (Figs. 9 and 12), each surrounded by a sleeve 116 carrying a stud 117. The sleeves 116 are connected by a bar 118 (Fig. 7) carrying a plate 119 which is secured thereto by bolts 120 projecting through slots (not shown) in the plate 119. By this means the plate 119 may be adjusted so that its forward edge will extend over the top of the bar 118 the required distance, depending upon the thickness of the cards which are being assorted.

After the plate 119 has been adjusted so that it extends over the bar 118 just far enough to engage one card, said plate is moved downward and moves the first card (Fig. 9) down between the table 97 and the front edge of the casting 101. The means for moving the plate 119 downward will now be described. Pivoted to each of the studs 117 (Figs. 3, 4 and 12) is a link 121. These links are also pivoted to arms 122 fast on a shaft 123 supported by the frames 60 and 61. The shaft 123 makes one counter-clockwise rotation (Fig. 3) for each cycle of operation of the machine, thereby moving the links 121 and sleeves 116 downward which carries the plate 119 downward and moves the first card into the machine. When this card is moved the proper distance the sleeves 116 and the bar 118 are moved upward, as the shaft 123 completes its rotation, thus moving the plate 119 into position to move the next card down into the machine.

The means for rotating the shaft 123 will now be described. Fast on the previously described shaft 77 is a gear 125 (Figs. 7 and 9) meshing with a gear 126 fast on the shaft 123. As previously described, the shaft 77 is rotated clockwise (Fig. 9) and therefore the gears 125 and 126 will cause a counter-clockwise rotation of the shaft 123 (Figs. 3 and 9).

As the card is fed downward by the plate 119 it is fed between a metal roll 127 (Figs. 9 and 11) and four resilient rolls 128. The roll 127 is fast on a shaft 129 and the rolls 128 are mounted on a shaft 130 by means of a key 137 so that they may be moved longitudinally thereon but will rotate when said shaft is rotated. These rolls 127 and 128 feed the card downward through a guide 131 mounted on the shaft 77 and a rod 132 supported by frames 60 and 61. From the guide 131 the card passes between a feed roll 133 fast on the shaft 77 and a feed roll 134 fast on a shaft 135 supported by lugs 136 on the guide 131.

The means for driving the lower and upper sets of feed rolls will now be described. Fast on the shaft 129 (Fig. 3) is a gear 140 which meshes with the gear 79 on the shaft 80. Therefore counter-clockwise rotation of shaft 80 drives the shaft 129 clockwise. Fast on the other end of the shaft 129 is a gear 141 (Figs. 10 and 11) meshing with a gear 142 fast on the shaft 130. Movement of the shaft 129 through the gears 141 and 142 rotates the shaft 130 and rolls 128 counter-clockwise (Fig. 9). The lower roll 133 being fast on the shaft 77 is rotated counter-clockwise therewith. The roll 134 is rotated by friction of the card as it passes between said roll and the roll 133.

After the card has left the feed rolls 133 and 134 it passes between thin plates 145 (Figs. 1 and 9). There are two sets of these plates 145 arranged in pairs (Fig. 12). The particular pairs which the card passes between is determined by the location of the perforations in the card. The manner of determining which pairs of plates the cards shall pass between will be hereinafter described, it being sufficient at this time to state that the plates are opened up directly beneath the guide 131 so that the card passes in a straight line down from the rolls 133 and 134. Each pair of plates 145 terminates at a different point so that the cards may be deposited in any one of eleven pockets designated "X" and "0" to "9" inclusive (Fig. 1). For example, if a card passes from the guide 131 with the plates 145 as shown in Fig. 9, it is deposited in the "9" pocket. The path, however, for the 9 pocket is not between any pairs of plates 145 but is in front of the left hand plates 145 and between the same and a deflecting plate 146 which is secured to the frames 60 and 61. To deposit a card in the "8" pocket it must pass between the first two left hand plates 145 until it strikes the deflecting plates 146 associated with the "8" pocket. The bottom and backs of these pockets are formed by angle plates 147 (Fig. 1).

The means for carrying the cards downward between the plates to their various stations or pockets will now be described. Fast on the shaft 74 are two pulleys 148 (Figs. 1, 9 and 12). Fast on a pair of arms 149 pivoted on the frame work 51 is another pair of pulleys 150. Running over the pulleys 148 and 150 are belts 151. The distance between the pairs of pulleys can be varied by means of turnbuckles 152 to keep the proper tension on the belts. Secured to the belts 151 at regular intervals are bars 153, each having flanges 154 in line with the belts. As the pulleys 148 rotate counter-clockwise (Fig. 9) a pair of flanges 154 is moved around so that they engage the top of the card after it has been deposited between the plates 145 and in this way the card is carried downward until it reaches the entrance to its respective pocket, wherein it is deposited. From the above description it can be clearly seen that as the cards are fed downward one after another there may be a continuous line of cards each to be deposited in the proper pocket as determined by the plates 145.

*Assorting mechanism.*

As above mentioned, the assorting of the cards is controlled by the location of the perforation or perforations in any one column. As the cards are assorted according to the data in one column at a time it is necessary to have only one contact or feeler. This feeler is adapted to cooperate with any of the columns and can be set so that the cards can be assorted according to the column desired.

The means for moving the feeler so that it may cooperate with any column desired will now be described. A shaft 157 (Fig. 9) is rotatably mounted in the frames 60 and 61. Fast on this shaft is an arm 158 having pivoted on the side thereof a lever 159, the lower end of which is normally held in engagement with a notch in a plate 160 by means of a compression spring 161. The plate 160 is secured to the frame 60. Slidably mounted on the shaft 157 is an arm 162 carrying two studs 163. These studs project through a slot 164 and support a plate 165 which carries a brush or feeler 166 adapted to cooperate with the card as it passes between the rolls 127 and 128. The brush 166 contacts with the roll 127 through the perforations in the column being used for control. This contact causes the completion of an electrical circuit which controls the selection of the pocket into which the card is to be deposited in a manner to be hereinafter described in detail. The plate 165 normally engages one of a series of notches 167 (Fig. 7) in a plate 168 secured to the casting 101. This prevents lateral movement of the arm 162 and also prevents the brush 166 from getting out of relation with the column with which it is set to cooperate.

To assort the cards according to the data in any column, the pinch lever, comprising the lever 159 and arm 158, is operated and the arm 158 moved clockwise until the lever 159 strikes a stop 169 on plate 160. This movement of lever 159 rocks the shaft 157 and the arm 162 to disengage the plate 165 from the notch 167. With the parts in this position the operator may slide the arm 162 either to the right or to the left (Fig. 7) to position the brush 166 to cooperate with the desired column. After being brought to the desired position the lever 159 is moved to normal position and the plate 165 again engages one of the notches 167, thus locking the brush 166 in its proper lateral position. The rolls 128 may also be moved laterally on the shaft 130 so that they will not interfere with the brush 166.

As the cards pass downward between the rolls 127 and 128, whenever a perforation comes opposite the brush a contact is made between the brush and the metal roll 127. It is the electrical impulses caused by these contacts which control the moving of the plates 145 to determine to which station the card shall be delivered. The mechanical portion of this mechanism will now be described; the electrical features will be taken up later.

The plates 145 have lugs 171 (Figs. 20, 22 and 23) thereon, each of which engages a notch 172 in a horizontal bar 173. There are twenty of these bars 173, ten on each side, (Fig. 18) and they are supported in notches 174 in brackets 175 (Fig. 8) secured to the frames 60 and 61, and in notches 176 in lugs 177 on bars 178 (Figs. 19 and 21) secured to the frames 60 and 61, and by notches 179 in the frames 62 and 63. Springs 180 attached to the bars 173 hold projections 181 on said bars in engagement with arms 182 fast on a shaft 183 supported by the frames 60 and 61. The upper ends of the arms 182 (Fig. 9) are Y-shaped and carry anti-friction rollers 185 and 186 which cooperate with cams 187 and 188 of double plate cams fast on the shaft 80. Counter-clockwise rotation of the cams 187 and 188 rock the arms 182 first counter-clockwise and then clockwise to normal position. After the arms are rocked counter-clockwise, the springs 180 move all of the horizontal bars 173 to the left except those which are held by an interfering member.

As these horizontal bars 173 are all connected to the plates 145 it will be clearly seen that the movement of said bars to the left will move the upper ends of the plates 145 to the left. If, for instance, an interference is placed in front of the fourth bar 173 from the top (Fig. 9), this bar and all the bars below it will be held but all the bars above it will move to the left, thus opening up the entrance to pocket No. 6. If an interference is placed in front of the second bar from the top this bar and all the bars below it will be held when the arms 182 are rocked counter-clockwise and only the top bar 173 will move to the left under the influence of its spring 180. Therefore, the left hand plate 145 (Fig. 9) will move to the left and an opening will be made so that the card will pass between the first two left hand plates 145 and into the "8" pocket.

Figure 25:
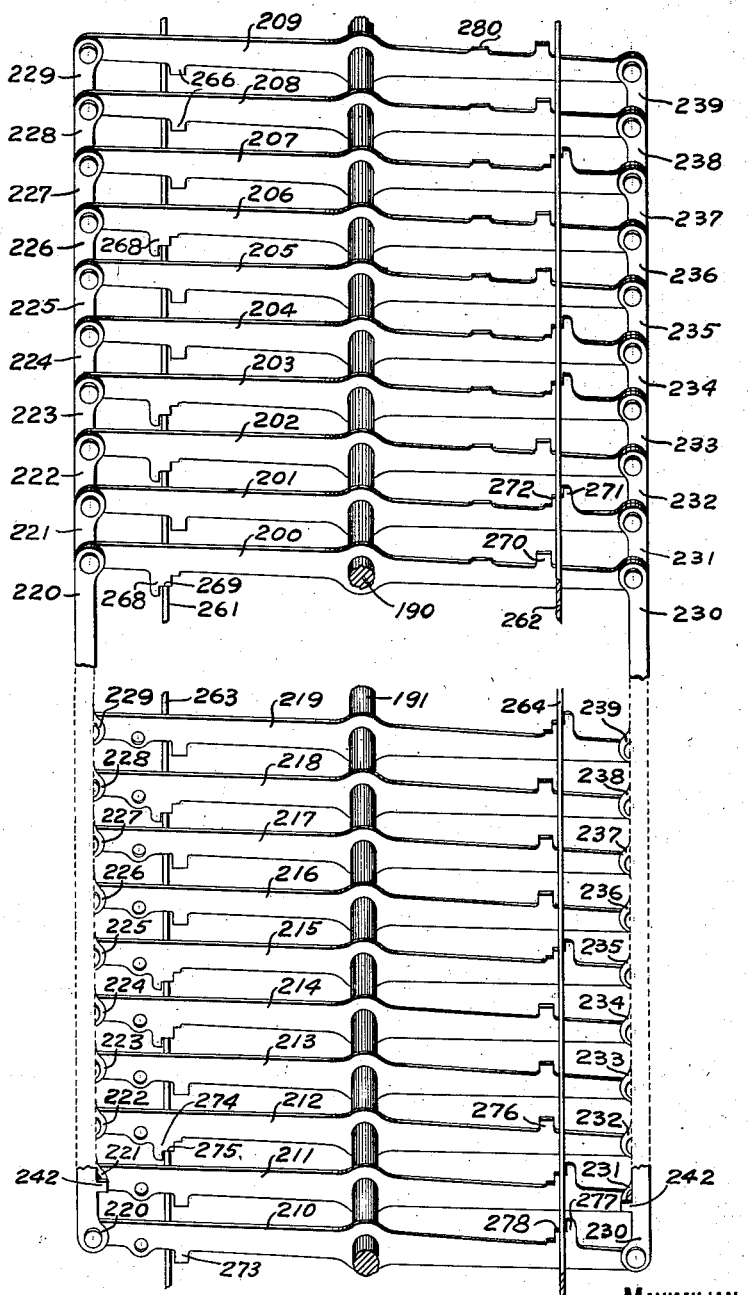
Fig. 25 is a diagrammatic view showing the relation between the lugs on the selecting levers and the bars operated by the electromagnets.

The means for determining which of the horizontal bars 173, shall have interferences placed so that said bars will be held will now be described:

Mounted on a shaft 190 (Figs. 23 and 25) are ten levers 200, 201, 202, 203, 204, 205, 206, 207, 208 and 209. Mounted on a shaft 191 are ten levers, 210, 211, 212, 213, 214, 215, 216, 217, 218 and 219. Pivoted between the left ends of the levers 200 to 209 and 210 to 219, respectively, are links 220, 221, 222, 223, 224, 225, 226, 227, 228 and 229. Pivoted to the right ends of the levers 200 to 209 and 210 to 219, respectively, are links, 230, 231, 232, 233, 234, 235, 236, 237, 238 and 239. The levers 200 and 210 and links 220 and 230 (Figs. 23 and 24) form a rectangular frame; the levers 201 and 211 and links 221 and 231 also form a rectangular frame. There are ten of these selecting frames, one for each of the pockets or stations 0 to 9 (Fig. 1). These frames are guided by slots 241 (Fig. 19) in the bars 178, said slots being adapted to receive the links 220 to 239. Springs 193 stretched between the upper ends of the links 230 to 239, inclusive, and an angle plate 194, (Fig. 16) secured to the frame 61 tend to rock the selecting frames clockwise (Fig. 16) or counter-clockwise (Figs. 23 and 25). The links 220 to 239, inclusive, each have a projection 242. Each of the horizontal bars 173 has a cut-away portion 243. These cut-away portions for all bars begin at the same point at the left end (Figs. 18 and 23), but all terminate at different points at the right. These points are just to the right of the links 220 to 239, inclusive. The projections 242 on the links 220 to 229, inclusive, are just above the left hand bars 173 (Fig. 23), that is, the projection 242 on the link 220 is just above the lower bar 173, the projection 242 of link 221 is just above the second bar from the bottom, and so on. The stepped location of these lugs is clearly illustrated in Fig. 24. The lugs 242 on the links 230 to 239 lie just below the right hand bars 173 (Fig. 23). The lug 242 of link 230 is below the lower bar 173, the lug 242 of link 231 is below the second bar from the bottom, the lug on the link 232 is below the third bar from the bottom, and so on to the top.

From the above description it can be seen that if the levers 200 and 210 are permitted to rock counter-clockwise (Figs. 23 and 25) under the influence of the spring 193, the lug 242 on the link 220 will be moved downward and the lug 242 on the link 230 will be moved upward. This movement of the links 220 and 230 will position the lugs 242 thereon so as to form an interference against the movement of the lower horizontal bars 173 under the influence of their springs 180, towards the left when the arms 182 are rocked counter-clockwise. All of the bars 173 except the bottom one in this case will move to the left under the influence of their springs 180 and consequently all of the plates 145 except the one which is attached to the lower bars 173 will move to the left (Figs. 1 and 9), thus making a path for the card from the feed rolls 133 and 134 direct to the "0" pocket.

If the levers 201 and 211 are rocked counter-clockwise, by their springs 193, the link 221 will move downward and the link 231 will move upward, thereby positioning the lugs 242 on said links, so that an interference is placed in the path of movement of the second lower bars 173 to hold them against the action of their springs 180. In this case the two bottom bars 173 will be held in normal position and all of the bars 173 above them will move to the left and a path will be made from the feed rolls 133 and 134 to the "1" pocket.

If the levers 209 and 219 are rocked counter-clockwise the link 229 will move downward and the link 239 will move upward, thus placing an interference in front of the top bars 173. In this case, when the arms 182 are rocked counter-clockwise, all of the bars 173 will be held in the position shown and the plates 145 will stand as shown in Fig. 9, thus providing a path from the rolls 133 and 134 to the "9" pocket.

The manner of selecting or determining which pair of levers 200 to 209 and 210 to 219 shall rock to cause the interference to be placed in front of the bars 173 is determined by the location of the perforation in the vertical columns of the card (Fig. 5). For example, if the cards are being assorted according to the right hand column, the levers 200 and 210 will be rocked so that the horizontal bars 173 will select a path to the "0" pocket, because this column has perforations in the I and IV positions, which, according to Fig. 6 represent "0". If the cards are being assorted according to the fourth column from the right, there being perforations in the III and IV positions, the levers 205 and 215 will be rocked, thereby providing a path for the card to the "5" pocket.

Figures 16, 17:
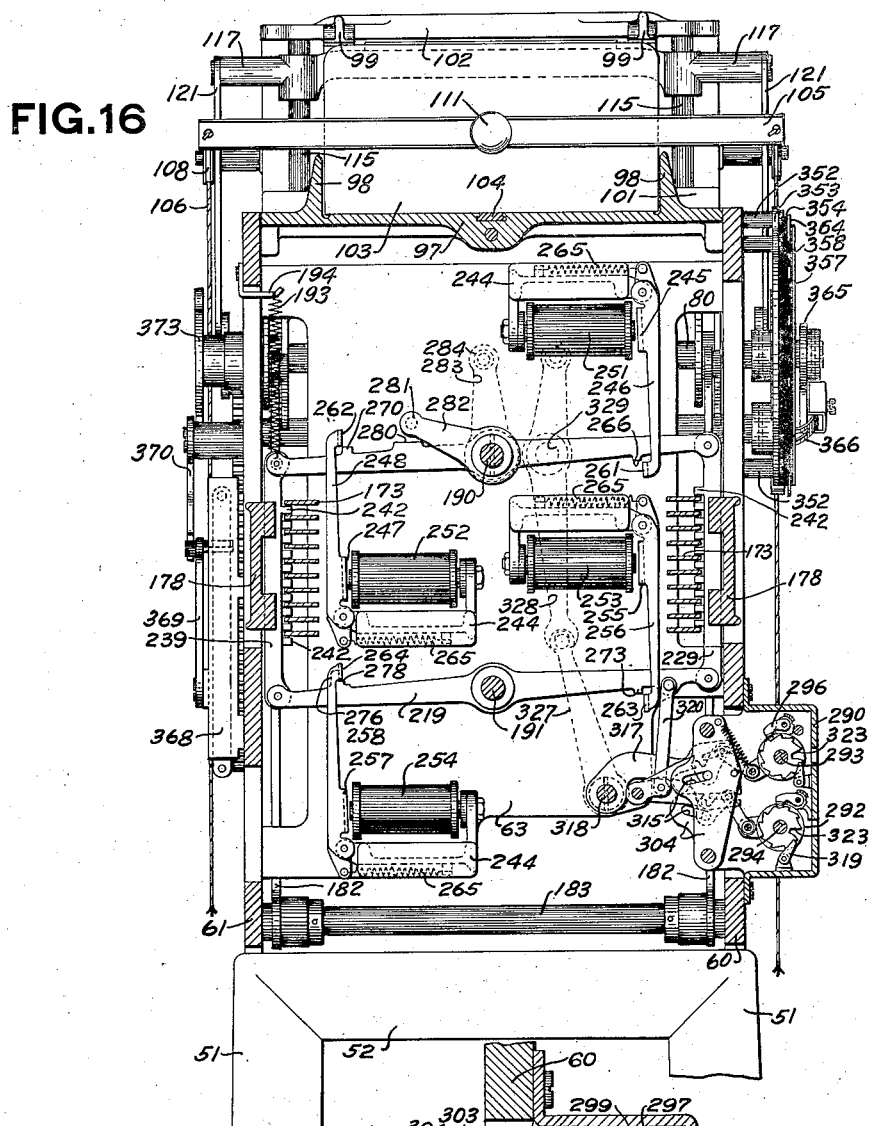
Fig. 16 is a section on line 16—16 of Fig. 9, looking in the direction of the arrows.
Fig. 17 is a section on line 17—17 of Fig. 13, looking in the direction of the arrows.

Cooperating with the levers 200 to 209, inclusive, are two electro-magnets 251 and 252 (Fig. 16). Cooperating with the levers 210 and 219, inclusive, are two electro-magnets 253 and 254. These magnets are supported by castings 244 mounted between the frames 62 and 63. There are two magnets 251 wired in series, two magnets 252 wired in series, two magnets 253 wired in series, and two magnets 254 wired in series. Integral with the armature 245 of the magnets 251 are parallel arms 246 connected by a bar 261 which extends across the underside of all the levers 200 to 209, inclusive. Integral with the armature 247 of the magnets 252 are parallel arms 248 (Figs. 16 and 18) connected by a bar 262 which extends across the top of all the levers 200 to 209, inclusive. Integral with the armature 255 of the magnets 253 are parallel arms 256 (Figs. 9 and 16) connected by a bar 263 which extends across the bottom of all the levers 210 to 219, inclusive. Integral with the armature 257 of the magnet 254 are parallel arms 258 connected by a bar 264 which extends across the upper side of all the levers 210 to 219, inclusive. Springs 265 (Fig. 16) normally hold the bars 261, 262, 263 and 264 in the position shown in Figs. 16 and 25. When the magnets 251 and 253 are energized, by means to be hereinafter described, the bars 261 and 263 are moved to the left, (Fig. 16) or right (Fig. 25) and when the magnets 252 and 254 are energized the bars 262 and 264 are moved to the right (Fig. 16) or left (Fig. 25).

The bar 261 cooperates with lugs 266 (Fig. 25) on the lower side of the levers 201, 204, 205, 207, 208 and 209 and also with lugs 268 on the lower edge of the levers 200, 202, 203 and 206 and normally engages steps 269 on these lugs 268.

The bar 262 cooperates with lugs 270 on the upper edges of the levers 200, 202, 205, 206, 208 and 209 and also with lugs 271 on the levers 201, 203, 204 and 207 and engages shoulders 272 on these lugs 271.

The bar 263 cooperates with lugs 273 on the lower edges of the levers 210, 211, 213, 216, 217 and 219 and also with lugs 274 on the lower edges of the levers 212, 214, 215 and 218 and normally engages shoulders 275 on the lugs 274.

The bar 264 cooperates with lugs 276 on the upper edges of the levers 212, 213, 214, 216, 217 and 218 and also with lugs 277 on the upper edges of the levers 210, 211, 215 and 219 and normally engages a shoulder 278 on the lugs 277.

From the above description it can be seen that the bar 261, through its engagement with the shoulders 269 on the levers 200, 202, 203 and 206 prevents said levers from being rocked counter-clockwise; the bar 262 being in engagement with the shoulders 272 of the levers 201, 203, 204, and 207 prevents these levers from being rocked counter-clockwise; the bar 263 being in engagement with the shoulders 275 on the levers 212, 214, 215 and 218 prevents these levers from being rocked counter-clockwise; and the bar 264 being in engagement with the shoulders 278 on the levers 210, 211, 215 and 219 prevents these levers from being rocked counter-clockwise. Thus it can be seen that all of the levers 200 to 219, inclusive, are normally locked in the position shown in Figs. 16, 23, 24 and 25.

Now, let it be assumed that a card is being run through the machine and that a single perforation occurs in the IV position such as in the 7th column from the right (Fig. 5). A perforation in this position, as above described, represents 9. When this card passes through the machine and the brush 166 makes a contact through this hole in the IV position, the magnets 254 will be energized and attract their armatures 257, thus moving the bar 264 to the right (Fig. 16) or left (Fig. 25). This movement of said bar causes it to be disengaged from the shoulders 278 on the levers 210, 211, 215 and 219 and to engage the lugs 276 on the levers 212, 213, 214, 216, 217 and 218. This brings the bar 264 above the lower step on the lugs 277 of the levers 210, 211, 215 and 219. As none of the other magnets 251, 252 and 253 are energized their bars 261, 262 and 263 will remain in the position shown (Figs. 16 and 25). As these bars are normally disengaged from plain lugs 266, 270 and 273 on the levers 209, 219, and as the bar 264 is moved over the lower step of the lug 277, it can be seen that the spring 193 connected to these levers 209 and 219 will rock them clockwise (Fig. 16), or counter-clockwise (Figs. 23, 24 and 25). However, none of the other levers can be rocked at this time because the bar 261 being in engagement with the shoulders 269 prevents the levers 200, 202, 203, 206 from being rocked, the bar 262 by its engagement with the shoulders 272 prevents the levers 201, 203, 204 and 207 from being rocked, and the bar 263 by its engagement with the shoulders 275 prevents the levers 212, 214, 215 and 218 from being rocked. If the bar 200 is prevented from being rocked the bar 210 is also prevented, as they are tied together by the links 220 and 230. Thus it can be seen that the levers 209 and 219 are the only ones which are free to be rocked when the magnets 254 alone are energized. When these levers alone are rocked they position the lugs 242 on the links 229 and 239 in front of the top horizontal bars 173, thus placing an interference in front of said bars so that they cannot move to the left at the time the arms 182 are moved away from the projections 181 on these horizontal bars. By preventing the movement of the top horizontal bars 173, all the bars beneath are held, because these top bars cooperate with the lugs 171 on the left hand plates 145 (Fig. 22). Consequently a path is provided for the card to the "9" pocket.

If perforations appear in the I and IV positions on the card the magnets 251 and 254 will be energized and the bar 261 will move to the left (Fig. 16) or right (Fig. 25) and the bar 264 will move to the right (Fig. 16) or left (Fig. 25). Perforations in these two positions I and IV represent 0. With the bar 261 moved as above described, it cooperates with the lower step of the lug 268 on the lower side of the lever 200 (Figs. 24 and 25). The bar 264 will cooperate with the lower step of the lug 277 on the upper side of the lever 210 (Figs. 23 and 25). The bars 262 and 263 will remain in the position shown in Figs. 16 and 25. Therefore, these two levers 200 and 210 will be allowed to rock counter-clockwise (Figs. 23, 24 and 25) under the influence of the spring 193, and all the remaining levers will be held in normal position when the magnets 251 and 254 are energized in combination. The bar 262 normally prevents the levers 201, 203, 204 and 207 from being moved and the bar 263 normally prevents the levers 212, 214, 215 and 218 from being moved. The bar 261 during this particular operation is directly below the plain lugs 266 on the levers 201, 204, 205, 207, 208 and 209 and prevents them from being rocked. The bar 264 during this operation is directly above the plain lugs 276 on the levers 212, 213, 214, 216, 217 and 218 and prevents them from being rocked.

This leaves, as above stated, only the levers 200 and 210 free to be rocked by the spring 193 and the link 220 moves downward (Figs. 23 and 25) and the link 230 moves upward, thus placing an interference in front of the lower horizontal bars 173 so that they cannot be moved under the influence of their springs 180, when the levers 182 are moved to the left. This means that all of the nine upper horizontal bars 173, on each side will move to the left (Figs. 9 and 23) and rock the plates 145 so that a path is provided from the rolls 133 and 134 direct to the "0" pocket.

It is not thought necessary to describe in detail how all of these selecting levers are prevented from being rocked, as was done in connection with the levers 200 and 210, which control the path to the "0" pocket and the levers 209 and 219, which control the path to the "9" pocket. They will therefore, be referred to but briefly.

When perforations occur in the II and IV positions the magnets 252 and 254 are energized and the levers 201 and 211 are the only ones which can be rocked due to the combinations and locations of the lugs on these levers. When these levers are rocked a path is provided to the "1" pocket. Perforations in the I and II positions represent "3", and the magnets 251 and 252 will be energized and the levers 203 and 213 will be rocked so that the card will be deposited in the "3" pocket. Perforations in the II and III positions represent "4" and the levers 204 and 214 will be allowed to rock, by the energization of the magnets 252 and 253, thus providing a path to the "4" pocket. Perforations in the III and IV positions represent "5" and the magnets 253 and 254 will be energized, thus allowing only the levers 205 and 215 to be rocked, thereby causing the card to be deposited in the "5" pocket. A single perforation in the I position represents "6" and consequently only the magnets 251 will be energized and allow only the levers 206 and 216 to be rocked so that the card will be deposited in the "6" pocket. A single perforation in the II position represents "7" and causes the magnets 252 to be energized, which allows the levers 207 and 217 to be rocked, so that the card will be deposited in the "7" pocket. A single perforation in the III position represents "8" and the magnets 253 will be energized to allow only the levers 208 and 218 to be rocked so that the card will be deposited in the "8" pocket. A single perforation in the IV position, as above described, controls mechanism so that the card is deposited in the "9" pocket.

When there are no holes in a column none of the magnets 251, 252, 253 or 254 are energized. Consequently when the arms 182 are rocked counter-clockwise (Fig. 23) all of the horizontal bars 173 move to the left (Fig. 9) under the action of their springs 180, and all of the plates 145 are moved to the left, thus providing a path for the card so that it will be deposited in the "X" pocket.

During each cycle of operation the levers which have been rocked must be restored to the position shown in Fig. 16. The means for restoring these levers will now be described.

Each of the levers 200 to 209, inclusive, has a lug 280 with which cooperates a rod 281 carried by parallel arms 282 fast on the shaft 190. Also fast on the shaft 190 is an arm 283 (Fig. 12) carrying an antifriction roller 284 cooperating with a cam 285 in a drum 286 fast on the cam shaft 80. This race 285 is such that the shaft 190 is rocked counter-clockwise and then clockwise to normal during each cycle of operation. During the counter-clockwise movement of the shaft 190 the rod 281 is moved downward thereby moving any of the previously rocked links 200 to 209, inclusive, counter-clockwise (Fig. 16), or clockwise, (Figs. 23 and 25) to normal position. The shaft 190 then raises the rod 281 to the position shown in Fig. 16 ready for the next cycle of operation.

Counters.

The machine is provided with ten step by step counters which are numbered "0" to "9" in Fig. 3. There is one counter for each of the stations or pockets "0" to "9" and they are actuated each time a card is deposited in its respective station. In other words, when a card is deposited in the "0" pocket the "0" counter is operated to add 1. If a card is deposited in the "2" pocket the "2" counter is operated to add 1, and so on for the remaining pockets, except the "X" pocket for which there is no counter.

These counters are enclosed in a casing 290 secured to the frame 60. This casing has openings 291 so that the amounts on the various counters may be ascertained. Each counter consists of five counter wheels 292. Five of the counters, "1," "3," "5," "7" and "9" are mounted upon a shaft 293 (Fig. 17) supported by the casing 290. The other five counters, "0," "2," "4," "6" and "8" are mounted upon a shaft 294, also supported by the casing 290. As all of these counters are identical, a description of one will suffice.

Secured to each counter wheel 292 is a ratchet 295 (Figs. 13 and 17). Cooperating with the five ratchets of each counter is a differentially tined pawl 296 pivotally mounted upon a rod 297 carried by parallel levers 298 loosely mounted on the shafts 293 and 294. These levers are made integral by a yoke 299. The tines of the pawl 296 are held in engagement with the ratchets by a torsion spring 300, one end of which is connected to the pawl and the other end to the yoke 299. A spring 301 stretched between a rod 302, carried by the levers 298, and a pin 303 on a plate 304, holds the levers 298 against a stop rod 305 supported by the casing 290. This holds the pawl 296 in the position shown in Fig. 17. The plate 304 is supported by rods 306 and 307 carried by the casing 290. The levers 298 associated with the lower counters are held against a block 308 secured to the casing 290.

Pivoted to each rod 302 is a link 311 carrying a stud 312 to which is pivoted a link 313. Each link 313 carries a stud 314 projecting through a slot 315 in each plate 304. Each stud 312 projects through a slot 316 in an arm 317 fast on a shaft 318 supported by the frames 62 and 63.

By means to be hereinafter described, the shaft 318 and arm 317 are rocked clockwise (Fig. 17) and then counter clockwise to normal position. As the arm 317 is rocked clockwise it, through the engagement of its slot 316 with the stud 312, moves said stud downward and straightens out the toggle formed by the links 311 and 313. Now, if an obstruction is placed at the left of stud 314 the straightening of the toggle links 311 and 313 will rock the levers 298 counter-clockwise and cause the pawl 296 to turn the units counter wheel one step. When the arm 317 is moved counter-clockwise to normal the links 311 and 313 again assume the position shown in Fig. 17, thereby rocking the levers 298 clockwise, which moves the pawl 296 back to the position shown. Retaining pawls 319 prevent retrograde movement of the counter wheels.

Should there be no obstruction placed at the left of stud 314 the straightening of links 311 and 313 simply moves the stud 314 to the left in the slot 315 and the levers 298 are not turned.

The means for placing the obstruction in front of the stud 314 of the desired counter will now be described. Pivoted to each of the levers 210 to 219, inclusive, is a link 320, which is also pivoted to an arm 321 loose on a rod 322 carried by the frames 62 and 63. When any one of the levers 210 to 219, inclusive, is rocked clockwise (Fig. 16) it moves the link 320 downward and rocks the arm 321 clockwise and positions it so that it forms an obstruction for the stud 314. From the above description it will be clear that when the levers 210 to 219 are rocked under the control of the perforations in the card, the selection of the counter is made in accordance with the pocket which is selected to receive the card.

The means for rocking the shaft 318 and consequently the arms 317 so that the counters may be actuated when selected will now be described. Fast on the shaft 318 is an arm 327 (Figs. 12 and 16) connected by a pin and slot to a lever 328 loose on a stud 329 supported by the frame 63. The upper end of the lever carries an anti-friction roller 330 which projects in a cam race 331 in the previously described drum 286. The contour of the race 331 is such that the lever 328 is rocked first counter-clockwise and then clockwise to normal position. This movement through the medium of the arm 327 rocks the shaft 318 and consequently the arms 317 first clockwise and then counter-clockwise as previously described.

To transfer from lower to higher order in the counter each ratchet 295 has a deep notch 323 which cooperates with the tines of the pawls 296. As this type of transfer is very old and well known in the art no further description will be given.

The means for turning the counters to zero will now be described. All ten counters are simultaneously turned to zero. Each shaft 293 and 294 has a groove 333 (Fig. 17) which cooperates with spring-pressed pawls 334, one of which is carried on the inside of each of the counter wheels 292. The shaft 293 also has fast thereto a gear 335 and the shaft 294 has fast thereto a gear 336 (Fig. 15). Meshing with the gears 335 and 336 is a gear 337 fast on a sleeve 338 mounted on a stud 339 secured to the casing 290. The sleeve 338 also has fast thereto a knurled disk 340. Each of the other ends of the shafts 293 and 294 has fast thereto a disk 341 having a notch 342 normally engaged by a pawl 343 mounted on a screw stud 344 secured to a casing 290. This pawl is held in normal position by a spring 345. The disk 341 also carries a pin 346 normally engaged by a pawl 347. A spring 348 holds the pawl 347 in the position shown. This pawl 347 is also mounted on the screw stud 344.

When it is desired to turn the counters to zero, a disk 340 is first rotated slightly clockwise (Fig. 7). This slightly rotates the disks 341 clockwise (Fig. 14) which releases the pins 346 from the pawls 347 and the springs 348 rotate said pawls counter clockwise until a foot 349 on each strikes the pawls 343. This movement of the disks 341 allows the pawls 343 to be rocked counter-clockwise by their springs 345. This movement of the pawls 343 permits the pawls 347 to be rocked far enough so that they are entirely disengaged from the pins 346. The disk 340 is now given a complete counter clockwise rotation (Fig. 7) which, through the gears 337, 335 and 336, rotates the shafts 293 and 294 and the disks 341 counter-clockwise (Fig. 14). At the beginning of the counter-clockwise rotation of the shafts 293 and 294, the pawls 343 and 347 are rocked clockwise, the pawl 343 riding upon the true periphery of the disk 341. During this rotation of the shafts 293 and 294 the radial edges of the grooves 333 engage the pawls 334 and rotate the counter wheels 292 counter-clockwise (Fig. 17) to zero. As the counters reach zero, the pawls 343 are thrown back into the notches 342 by their springs 345, thereby allowing the pawls 347 to be rocked slightly counter-clockwise by their springs 348. This positions the pawls 347 so that as the disks 341 complete their rotation the pins 346 again engage the pawls 347, thus stopping the rotation of the disks 341 and shafts 293 and 294.

Electrical features.

The selecting switch will be considered first. Mounted on three studs 352 by means of screws is a substantially semicircular plate 353 (Figs. 3 and 16). Adjacent the plate 353 is an insulation plate 354 in which are imbedded fixed contacts 355, 361, 362, 363 and 364 and a line contact 356. An insulation plate 358 and a metal plate 357 hold the contacts 355, 361, 362, 363 and 364 in place.

Figure 26:
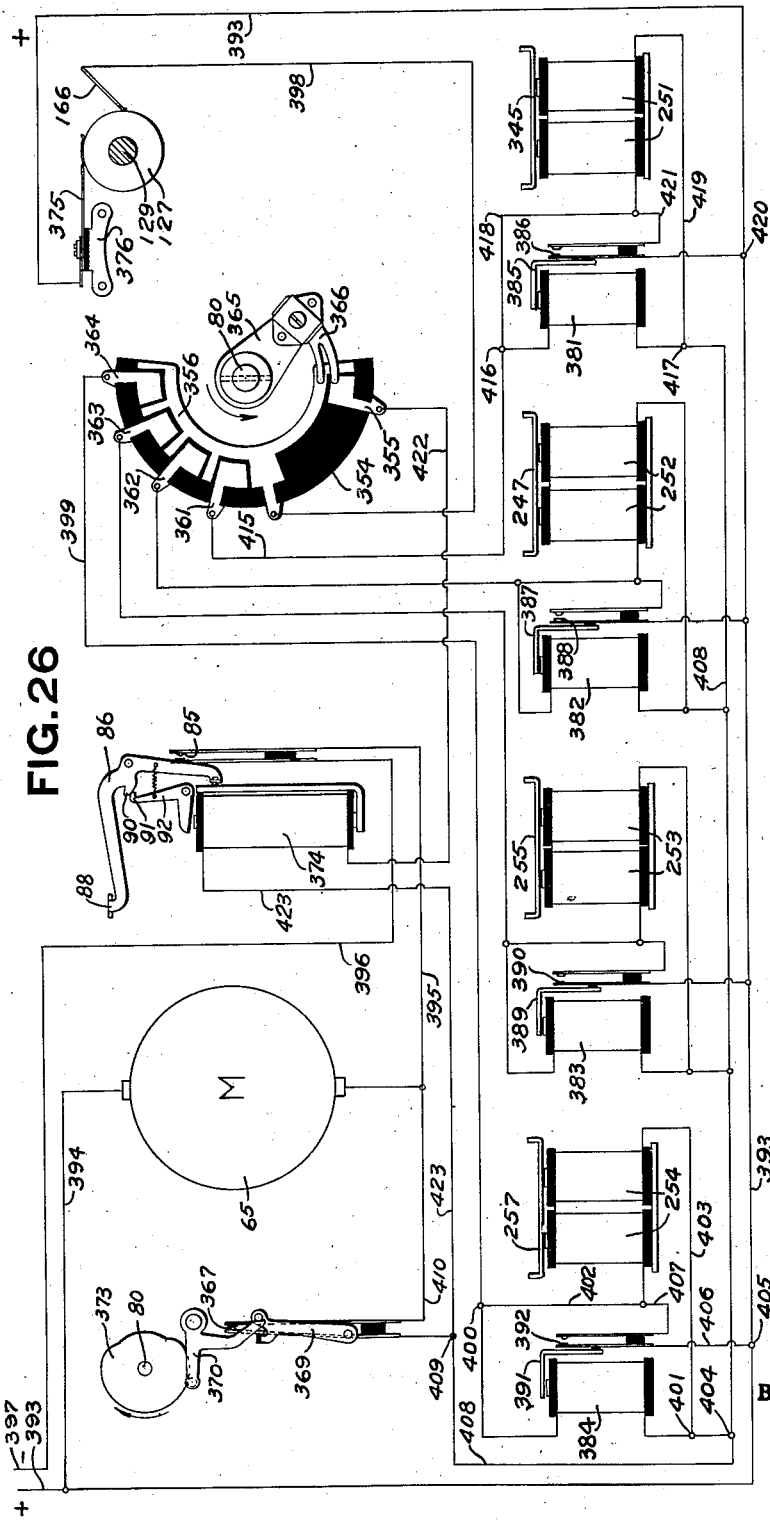
Fig. 26 is a wiring diagram for the electrical features of the machine.

Fast on the cam shaft 80 is an arm 365, which carries a movable contact 366 consisting of two fingers, one of which is adapted to contact with the line contact 356 and the other adapted to be moved into contact with the contacts 364, 363, 362, 361 and 355, respectively. This arm 365 moves in synchronism with the cards so that as the IV position on the card cooperates with the feeler 166, the contact 366 will cooperate with the contact 364, and when the III position cooperates with the feeler 166, the contact 366 will cooperate with the contact 363, and so on for all four positions. Normally this contact is in the position shown in Figs. 3 and 26. As the shaft 80 is given one counter-clockwise rotation for each cycle of operation the movable contact 366 is engaged with the respective contacts as above described. The circuits made during this movement will be hereinafter described.

The main switch and operating mechanism will now be described. The main switch 367 (Figs. 4 and 26) is mounted on a bracket 368 on the frame 61 and is actuated by an arm 369 pivoted on said bracket. The means for operating the actuating arm 369 is a lever 370 pivoted on a stud 371 on the frame 61. The lever 370 carries a roller 372 which cooperates with the periphery of a cam 373 fast on the cam shaft 80. This switch is closed at the beginnning of the cycle of operation but is opened once during each cycle after the movable contact 366 has passed the contact 355 but is closed before the contact 366 reaches contact 364.

The machine is provided with a stopping magnet 374 (Fig. 2) mounted on the bracket 87. The armature of this magnet 374 is integral with the previously described lever 92, the upper end of which, it will be remembered, engages the projection 90 on the starting lever 86 to hold the switch 85 closed so that the machine will operate a plurality of times. Whenever the cards run out a circuit is completed through this magnet 374 and it is energized and attracts its armature, thereby rocking the lever 92 counter-clockwise, which releases the starting lever 86 thus causing the switch 85 to open, and the machine stops at the end of the particular cycle in which the switch 85 is opened. The circuits through this magnet will be hereinafter described.

Cooperating with the metal feed drum 127 is a metal comb 375 (Fig. 11) secured to a bracket 376 mounted between the frames 60 and 61. The object of the comb construction is merely to act as a polisher for the roll 127 on the surfaces where the brush 166 contacts with the roll 127 through the perforations in the cards.

Associated with the magnets 251, 252, 253 and 254 are relay magnets 381, 382, 383 and 384, respectively (Figs. 3, 4, 18 and 26). The magnets 381 and 382 are mounted on the frame 61 and the magnets 383 and 384 are mounted on the frame 60. The armature 385 of the magnet 381 cooperates with a switch 386, the armature 387 of magnet 382 cooperates with a switch 388, armature 389 of magnet 383 cooperates with the switch 390, and armature 391 of magnet 384 cooperates with a switch 392. As it takes considerable time to operate the heavy armatures of magnets 251, 254, inclusive, these relay magnets 381 to 384 inclusive are introduced in the circuit and act immediately and close their respective switches, thereby maintaining the circuit through the magnets 251 to 254 to allow the mechanism which actuates the selecting levers to have plenty of time to work.

*Circuits.*

To start the machine the operator depresses the starting key 88, which rocks the lever 86 counter-clockwise (Fig. 26) and the hook 91 of the lever 92 holds the key 88 depressed. This closes the switch 85 and a circuit is completed from the positive line 393 through conductor 394, motor 65, conductor 395, switch 85, conductor 396, back to the negative line 397. This starts the motor and the cam shaft 80 rotates counter-clockwise.

If the cards in the machine are being assorted according to the right hand column (Fig. 5) and the card shown passes between the brush 166 and the roll 127, a contact is made between the brush and the roll 127 first in the IV and next in the I position. The time of the feeding of the card and the movement of the movable contact 366 is such that, as the card passes downward, the positions IV, III, II and I will come opposite the brush at the same time the movable contact engages the contacts 364, 363, 362 and 361 respectively.

Now, when a contact is made through the IV position, the circuit is as follows: From the positive line 393 (Fig. 26) to contact 375, through roll 127, brush 166, conductor 398, line contact 356, movable contact 366, contact 364, conductor 399, to point 400; from here through magnet 384 to point 401. From point 400 the circuit is also through conductor 402, magnets 254, conductor 403 to point 401, and from point 401 to point 404. The circuit through the magnet 384 energizes said magnet and it attracts its armature 391 and closes the switch 392. The circuit is then from point 405 on the positive line through conductor 406, switch 392, conductor 407, through the magnets 254, conductor 403, to point 401, and from there to point 404 on the negative line. The closing of this switch 392 holds the magnets 254 energized so that when the armature 257 thereof is attracted it will remain in the attracted position long enough for the selecting levers previously described to function to select the pocket. From the point 404 current goes through conductor 408 to point 409, through switch 367 (now closed), conductor 410 and joins conductor 395, then through switch 85, conductor 396 to the negative line 397.

As a movable contact continues in its movement a contact is made through the hole in the I position on the card. The circuit now completed is as follows: From the positive line 393 through contact 375, roll 127, brush 166, conductor 398, line contact 356, movable contact 366, contact 361, conductor 415, to point 416, through magnet 381, to point 417, through conductor 408, to point 409, switch 367, conductor 410, and joins conductor 395, then through switch 85, conductor 396, to the negative line 397. The circuit is also from point 416 through conductor 418, magnets 251, conductor 419, to point 417 and thence to the negative line. The circuit through magnet 381 causes it to attract its armature 385 which closes the switch 386. This completes the circuit from the point 420 on the positive line 393 through the switch 386, conductor 421, magnets 251, conductor 419 to point 417 and thence to the negative line. The energization of the magnets 251 and 254 causes the levers 200 and 210 to be locked and the card is deposited in the " 0 " pocket.

After the last card has been assorted and when the movable contact 366 engages the contact 355 the brush 166 will be in contact with the drum 127 and a circuit is completed as follows: From the positive line 393, contact 375, roll 127, brush 166, conductor 398, line contact 356, movable contact 366, contact 355, conductor 422, magnet 374, conductor 423, to point 409, switch 367, conductor 410 and joins conductor 395, then through switch 85, conductor 396 to the negative line 397. The circuit through this magnet 374 energizes it, whereupon it attracts its armature and rocks the lever 92 counter-clockwise, which releases the starting lever 86 and allows the switch 85 to open, thus breaking the circuit for the motor 65 and the machine stops at the end of this cycle. This happens only after the last card has passed the roll 127 because at all other times when cards are fed, the movable contact is on the contact 355 when the upper part of one of the cards is between the roll 127 and the brush 166. Consequently the circuit is broken at this point.

After this last card is assorted it has not yet been deposited in its pocket. Therefore it is necessary for the operator to again depress the starting key 88 and run the machine until all the cards which are at this time between the feed rolls 133 and 134 and the pockets have been deposited in their respective pockets, as determined by the location of the perforations in the columns on the cards. The final opening of the switch 85 deenergizes all magnets and opens all circuits.

Operation.

A brief description of the operation of the machine will now be given. When it is desired to sort a number of cards they are placed on the table 97 (Fig. 9) and the operator depresses the starting key 88. The cards are then fed downward one by one by means of the plate 119 and between the feed rolls 127 and 128 and the brush 166 makes a contact wherever there is a perforation in the cards. The location of the perforations as above described controls the electro-magnets 251 to 254, inclusive (Fig. 16) and these in turn through their armatures control the selecting levers 200 to 219 (Figs. 16, 23, 24 and 25) inclusive. The levers determine which path the card is to take after it leaves the feed rolls 133 and 134 by their control over the horizontal bars 173 in the manner previously described. After the cards have been moved between the proper plates 145 (Figs. 1 and 9) they are carried down to their respective stations by the flanges 154 on the belts 151 driven by the pulleys 148 and 150, which are, in turn, driven by the shaft 74 through the bevel gears 73 and 72, which receive their actuation direct from the motor-driven shaft 69. As the selecting levers are operated they in turn set up a condition whereby the counter associated with that particular lever is actuated to count the cards as they are deposited in the various pockets.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:—

1. In a machine of the class described, the combination of means for feeding cards having a plurality of control positions, a feeler cooperating with the cards as they are fed through the machine, card distributing mechanism, and a plurality of devices operated either singly or in combination as determined by the control positions of the card for controlling the distributing mechanism.

2. In a machine of the class described, the combination of means for feeding cards having a plurality of successively arranged control positions, a card distributing mechanism, a plurality of devices for controlling said mechanism, and a plurality of means equal in number to said control positions for controlling said devices as the cards pass a certain point during their movement.

3. In a machine of the class described, the combination of means for feeding cards having a plurality of successively arranged control positions, card distributing mechanism, a plurality of devices for controlling said mechanism, and a plurality of means equal in number to said control positions for controlling said devices said last mentioned means being adapted to be operated either singly or successively in combinations of twos and in synchronism with the control positions of the card as said card passes a certain point during its movement.

4. In a machine of the class described, the combination of means for feeding cards having a plurality of successively arranged control positions, card distributing mechanism, a plurality of destination stations under control of said distributing mechanism, and means for operating said distributing mechanism in synchronism with the movement of the card past a certain point to determine the stations to which the respective cards shall be delivered.

5. In a machine of the class described, the combination of means for feeding cards having a plurality of successively arranged control positions, a plurality of destination stations for the cards, a plurality of station selecting devices, a plurality of devices operated under control of the card and in synchronism with the movement thereof for determining the destination stations to which the respective cards shall be delivered.

6. In a machine of the class described, the combination of means for feeding cards having a plurality of successively arranged control positions, a feeler for cooperating with the cards as they are fed through the machine, a plurality of destination stations for the cards, means for providing a path to each station, and means operated in synchronism with the control positions of the cards for determining to which station a path shall be provided.

7. In a machine of the class described, the combination of means for feeding cards having a plurality of successively arranged control positions, a feeler cooperating with the cards as they are fed through the machine, a plurality of destination stations for the cards, station selecting mechanism, and means operated in synchronism with the movement of the control positions of the card past said feeler for controlling said selecting mechanism.

8. In a machine of the class described, the combination of means for feeding cards having a plurality of successively arranged control positions, a feeler for cooperating with the cards as they are fed through the machine, a plurality of destination stations for the cards, station selecting mechanism operated in synchronism with the control positions of the cards for selecting the stations to which the cards shall be delivered.

9. In a machine of the class described, the combination of means for feeding cards having four successively arranged control positions, ten destination stations, station selecting mechanism comprising ten frames one associated with each station, four devices cooperating with said frames and operated either singly or in successive combination of twos and in synchronism with the passage of the control positions of the card past a certain point for controlling said frames so that only one can be operated at a time.

10. In a machine of the class described, the combination of means for feeding cards having a plurality of successively arranged control positions, a feeler for cooperating with the cards as they are fed through the machine, assorting mechanism, devices equal in number to said control positions for controlling said assorting mechanism, and means operated in synchronism with the control positions of the card for controlling said devices.

11. In a machine of the class described, the combination of means for feeding cards having a plurality of control positions, a feeler for cooperating with the cards as they are fed through the machine, assorting mechanism, devices equal in number to said control positions for controlling said assorting mechanism, and means for operating said devices.

12. In a machine of the class described, the combination of means for feeding cards having four control positions, a feeler for cooperating with the cards as they are fed through the machine, assorting mechanism for sorting said cards into nine groups, devices equal in number to said control positions for controlling said assorting mechanism, and means for operating said devices one by one as a card passes said feeler.

13. In a machine of the class described, the combination of means for feeding cards having four successively arranged control positions, a feeler for cooperating with the cards as they are fed through the machine, assorting mechanism for sorting said cards into nine receptacles, devices equal in number to said control positions for controlling said assorting mechanism, and means for operating said devices as the respective control positions on a card are moved into co-operative relation with said feeler.

14. In a machine of the class described, the combination of means for feeding cards having a plurality of control positions, a plurality of destination stations, a plurality of station selecting devices, a plurality of devices equal in number to said control positions for locking said selecting devices, means for operating certain of said locking devices for releasing a certain one of said selecting devices, and means for actuating the selected device.

15. In a machine of the class described, the combination of means for feeding cards having a plurality of control positions, a plurality of destination stations, a plurality of station selecting devices equal in number to the stations, a plurality of devices equal in number to said control positions for locking said selecting devices, means for operating certain of said locking devices and in synchronism with the respective control positions of the cards for releasing a certain one of said selecting devices, and a feeler for cooperating with the cards for controlling said last mentioned means.

16. In a machine of the class described, the combination of mechanism for feeding cards having a plurality of control positions, a plurality of destination stations, means for providing a path to each station, a plurality of devices equal in number to the stations for controlling said means each device having thereon a plurality of projections, a plurality of members equal in number to said control positions for cooperating with said projections so as to lock all of said devices, and means for operating certain of said members to move them out of cooperation with said projections so as to release the desired device.

17. In a machine of the class described, the combination of mechanism for feeding cards having a plurality of successively arranged control positions, a plurality of destination stations, means for providing a path to each station, a plurality of devices equal in number to the stations for controlling said means each device having thereon a plurality of projections, a plurality of members equal in number to said control positions for cooperating with said projections so as to lock all of said devices, means operated in synchronism with the control positions of the card for operating certain of said members to move them out of cooperation with said projections so as to release the desired device, and a feeler for cooperating with the cards as they are fed into the machine for controlling said last mentioned means.

18. In a machine of the class described, the combination of mechanism for feeding cards having a plurality of control positions, a plurality of destination stations, means for providing a path to each station, a plurality of devices for controlling said means, a plurality of members, means for operating certain of said members, and a plurality of projections on each of said devices arranged to cooperate with said members so that they normally lock all of said devices and allow only one of them to be released when said certain of said members are operated.

19. In a machine of the class described, the combination of mechanism for feeding cards having a plurality of successively arranged control positions, a plurality of destination stations, means for providing a path to each station, a plurality of devices equal in number to the stations for controlling said means, a plurality of members equal in number to the control positions of the card, means operated in synchronism with the control positions of the card for operating certain of said members, and a plurality of projections on each of said devices arranged to cooperate with said members so as to normally prevent operation of any of said devices and allow movement of only one of said devices upon operation of any one or of said one and any other one of said members.

20. In a machine of the class described, the combination of means for feeding cards having a plurality of control positions, a plurality of destination stations, a plurality of station selecting devices equal in number to the number of stations, a plurality of members equal in number to the control positions of the card, means for operating certain of said members, and a plurality of projections on each of said selecting devices arranged so that said members normally lock all of said devices and allow only one of them to be operated upon operation of said certain of said members.

21. In a machine of the class described, the combination of means for feeding cards having a plurality of successively arranged control positions, a plurality of destination stations, station selecting devices equal in number to the number of stations, a plurality of members equal in number to the control positions of the card, means for operating any two of said members in synchronism with the respective control positions of the card, and a plurality of means on each of said selecting devices for cooperating with said members and so arranged that said members normally lock all of said selecting devices and allow only one of them to be released upon operation of two of said members.

22. In a machine of the class described, the combination of means for feeding cards having a plurality of control positions, a plurality of destination stations, station selecting devices, a plurality of members equal in number to the control positions of the card, means for operating any two of said members, a plurality of means on each of said selecting devices for cooperating with said members and so arranged that said members normally lock all of said selecting devices and allow only one of them to be released upon operation of two of said members, and means for operating the released selecting device.

23. In a machine of the class described, the combination of means for feeding cards having a plurality of successively arranged control positions, a feeler for cooperating with the cards as they are fed through the machine, card distributing mechanism, and a plurality of electro-magnets operated either singly or in combination and in synchronism with the control positions of the card for controlling said distributing mechanism.

24. In a machine of the class described, the combination of means for feeding cards having a plurality of successively arranged control positions, a feeler for cooperating with the cards as they are fed through the machine, card distributing mechanism, and a plurality of electro-magnets equal in number to the control positions of the card and operated in synchronism therewith for controlling said distributing mechanism.

25. In a machine of the class described, the combination of a card having a plurality of control positions, means for feeding said card, a feeler for cooperating with said card as it is fed through the machine, card distributing mechanism, and a plurality of devices operated in synchronism with the control positions of the card for controlling the distributing mechanism.

26. In a machine of the class described, the combination of a card having a plurality of control positions, means for feeding the card, a feeler for cooperating with the card as it is fed through the machine, card distributing mechanism, a plurality of destination stations, and a plurality of devices operated for controlling the distributing mechanism so as to send the card to the proper station.

27. In a machine of the class described, the combination of a card having a plurality of control positions, means for feeding the card, a feeler for cooperating with the card as it is fed through the machine, card distributing mechanism, a plurality of destination stations, and a plurality of devices operated either singly or in combination for controlling said distributing mechanism so as to send the card to the proper station.

28. In a machine of the class described, the combination of a card having a plurality of successively arranged control positions, means for feeding the card, a feeler for cooperating with the card as it is fed through the machine, card distributing mechanism, a plurality of destination stations, a plurality of devices operated either singly or in combination for controlling said distributing mechanism so as to send the card to the proper station, and means for carrying the card to the station selected.

29. In a machine of the class described, the combination of a card having a plurality of control positions, means for feeding the card, a feeler for cooperating with the card as it is fed through the machine, card distributing mechanism, a plurality of destination stations greater in number than the number of control positions of the card, a plurality of devices operated either singly or in combination for controlling the distributing mechanism so that the card will be sent to the proper station, and means for carrying the card to the selected station.

30. In a machine of the class described, the combination of a card having a plurality of control positions, means for feeding the card, a feeler for cooperating with the card as it is fed through the machine, card distributing mechanism, and a plurality of electro-magnets adapted to be operated either singly or in combination for controlling the distributing mechanism.

31. In a machine of the class described, the combination of a card having a plurality of successively arranged control positions, means for feeding the card, a feeler for cooperating with the card as it is fed through the machine, card distributing mechanism, a plurality of electro-magnets equal in number to the control positions of the card and adapted to be operated either singly or in combination and in synchronism with the respective control positions of the card for controlling the distributing mechanism.

32. In a machine of the class described, the combination of a card having four control positions, means for feeding the card, a feeler for cooperating with the card as it is fed through the machine, card distributing mechanism, a plurality of destination stations greater in number than the control positions of the card, four electro-magnets, and means for operating any two of said magnets to control the distributing mechanism so that the card will be sent to the station corresponding to the magnets operated.

33. In a machine of the class described, the combination of means for feeding cards having a plurality of contact positions, a contact for cooperating with the cards as they are fed through the machine, a plurality of magnets equal in number to the contact positions of the card, and a switch having stationary contacts equal in number to the magnets and a movable contact for closing the circuits to the magnets in synchronism with the contact positions of the card.

34. In a machine of the class described, the combination of means for feeding cards having four control fields, a contact for cooperating with the cards as they are fed through the machine, four magnets to control the distribution of the cards into nine groups, and a switch for closing the circuits to the magnets in synchronism with the control fields of the card.

35. In a machine of the class described, the combination of means for feeding cards having a plurality of control fields, a contact feeler for cooperating with the cards as they are fed through the machine, a plurality of magnets equal in number to the control fields of the card, a plurality of circuits one for each magnet, means for closing the magnet circuits in synchronism with the movement of the card past said feeler, a motor for driving said feeding means, means for starting said motor, and automatic means for stopping said motor after the last card has been fed through the machine.

36. In a machine of the class described, the combination of means for feeding cards having a plurality of control fields, a contact feeler for cooperating with the cards as they are fed through the machine, a plurality of magnets equal in number to the control fields of the card, a plurality of circuits one for each magnet, means for closing the magnet circuits in synchronism with the movement of the card past said feeler, a motor for driving said feeding means, means for starting said motor, and means controlled by the circuit controlling means for automatically stopping said motor.

37. In a machine of the class described, the combination of means for feeding cards having a plurality of successively arranged control fields, a contact feeler for cooperating with the cards as they are fed through the machine, a plurality of magnets equal in number to the control fields of the card, a plurality of circuits one for each magnet, a switch for closing the magnet circuits in synchronism with the movement of the card past the feeler, a motor for driving said feeding means, means for starting said motor, and automatic means controlled by said switch for stopping said motor.

38. In a machine of the class described, the combination of means for feeding cards having a plurality of contact positions, a contact for cooperating with the cards as they are fed through the machine, a plurality of magnets equal in number to the contact positions of the cards, a switch for closing the circuits to the magnets in synchronism with the contact positions of the card, an electric motor, a control switch therefor, means for closing the control switch, means for locking said closing means, and means for automatically releasing said locking means after the last card has been fed into the machine.

39. In a machine of the class described, the combination of means for feedings cards having a plurality of successively arranged contact positions, a contact for cooperating with the cards as they are fed through the machine, a plurality of magnets equal in number to said contact positions, a switch for closing the circuits to the magnets in synchronism with the contact positions of the cards, an electric motor, a control switch therefor, manually operated means for closing the control switch, means for locking said manually operated means, and means for automatically releasing said locking means after the last card has been fed into the machine.

40. In a machine of the class described, the combination of means for feeding cards having a plurality of successively arranged contact positions, a contact for cooperating with the cards as they are fed through the machine, a plurality of magnets equal in number to the contact positions of the card, a switch for closing the circuits to the magnets in synchronism with the contact positions of the card, an electric motor, a control switch therefor, means for closing said control switch and maintaining it closed, and means for automatically releasing said closing means.

41. In a machine of the class described, the combination of means for feeding cards having a plurality of successively arranged contact positions, a contact for cooperating with the cards as they are fed through the machine, a plurality of magnets equal in number to the contact positions of the card, a switch for closing the circuits to the magnets in synchronism with the contact positions of the card, an electric motor, a control switch therefor, manually operated means for closing the control switch, means for locking said manually operated means, and an electro-magnet for releasing said locking means after the last card has been fed into the machine.

42. In a machine of the class described, the combination of means for feeding cards having a plurality of contact positions, a contact for cooperating with the cards as they are fed through the machine, a plurality of destination stations greater in number than the contact positions on the card, means for providing a path for the cards to each station, means for selecting the station to which the path shall be provided, a plurality of magnets equal in number to the contact positions on a card for controlling said selecting means, and a switch operated in synchronism with the movement of the card for controlling said magnets.

43. In a machine of the class described, the combination of means for feeding cards having four control fields, a contact feeler for cooperating with the cards as they are fed through the machine, a plurality of destination stations greater in number than the control fields on a card, station selecting devices, four magnets for controlling said selecting devices, and a switch for closing the circuits to the magnets in synchronism with the control fields of the card.

44. In a machine of the class described, the combination of means for feeding cards having four successively arranged control fields with a perforation in one or more of said fields, a contact feeler cooperating with the cards as they are fed through the machine, ten destination stations, station selecting mechanism, four magnets for controlling said selecting mechanism, a circuit for each magnet, a circuit for said feeler, a switch having five terminals one for each magnet circuit and one for the feeler circuit, and means for closing the magnet circuits one by one in synchronism with the control fields of the card so that when a perforation in a field cooperates with the feeler the respective magnet will be energized.

45. In a machine of the class described, the combination of means for feeding cards having a plurality of control positions, a plurality of selecting devices, a plurality of members equal in number to said control positions for locking said selecting devices, and means for operating certain of said members in synchronism with said control positions for releasing the selecting device corresponding to the particular card being fed.

46. In a machine of the class described, the combination of means for feeding cards having a plurality of successively arranged control positions, a plurality of selecting devices, a plurality of members equal in number to said control positions for locking said selecting devices, means for operating certain of said members in synchronism with said control positions for releasing the selecting device corresponding to the particular card being fed, and means for actuating the selected device.

47. In a machine of the class described, the combination of means for feeding cards having a plurality of control positions, a plurality of selecting devices, a plurality of members equal in number to said control positions for rendering the selecting devices ineffective, and means for operating any two of said members in synchronism with the respective control positions for rendering the desired selecting device effective.

48. In a machine of the class described, the combination of means for feeding cards having a plurality of control positions, a plurality of selecting devices, a plurality of members equal in number to said control positions for rendering the selecting devices normally ineffective, and means for operating any two of said members in synchronism with the respective control positions for rendering the desired selecting device effective.

In testimony whereof I affix my signature.

MAXIMILIAN M. GOLDBERG.